(12) United States Patent
Park et al.

(10) Patent No.: US 9,910,505 B2
(45) Date of Patent: Mar. 6, 2018

(54) MOTION CONTROL FOR MANAGING CONTENT

(71) Applicant: Amazon Technologies, Inc., Reno, NV (US)

(72) Inventors: Jae Pum Park, Bellevue, WA (US); Mike Dodge, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 518 days.

(21) Appl. No.: 14/469,520

(22) Filed: Aug. 26, 2014

(65) Prior Publication Data
US 2015/0362998 A1 Dec. 17, 2015

Related U.S. Application Data

(60) Provisional application No. 62/013,386, filed on Jun. 17, 2014.

(51) Int. Cl.
*G06F 3/01* (2006.01)
*G06F 3/0488* (2013.01)
(Continued)

(52) U.S. Cl.
CPC .............. *G06F 3/017* (2013.01); *G06F 3/012* (2013.01); *G06F 3/0346* (2013.01);
(Continued)

(58) Field of Classification Search
CPC . G06F 3/017; G06F 1/16; G06F 3/012; G06F 3/0346; G06F 3/0485; G06F 3/04883; G06F 2203/04806
See application file for complete search history.

(56) References Cited

U.S. PATENT DOCUMENTS 8,854,433 B1 * 10/2014 Rafii ....................... G06F 3/017
348/42
8,977,987 B1 * 3/2015 Korn ....................... G06F 3/016
715/702
(Continued)

OTHER PUBLICATIONS

International Search Report and Written Opinion for International Patent Application PCT/US15/35201, dated Sep. 15, 2015, 15 pages.

*Primary Examiner* — Sejoon Ahn
(74) *Attorney, Agent, or Firm* — Polsinelli LLP

(57) ABSTRACT

Approaches are described for managing content via an electronic device. In particular, various embodiments enable single-handed approaches to adjusting content provided by a computing device. For example, the computing device (e.g., a mobile phone) or other portable computing device can detect a touch-based gesture input (e.g., a tap and hold) on a display screen to activate a content control mode (e.g., a zoom control mode, a panning control mode, a volume control mode). As the device is moved relative to user of the device or some other reference point, the device can cause a zooming, panning, or audio function to be executed. In this way, as the user holds the device and tilts, rotates, or otherwise changes the orientation of the device, or as the user's relative position or orientation changes with respect to the device, the content can appear to be zoomed-in or zoomed-out on, panned, or otherwise adjusted based at least in part on the function executed.

17 Claims, 15 Drawing Sheets

(51) Int. Cl.
 *G06F 3/0485* (2013.01)
 *G06F 3/0346* (2013.01)
(52) U.S. Cl.
 CPC ........ *G06F 3/0485* (2013.01); *G06F 3/04883* (2013.01); *G06F 2203/04806* (2013.01)

(56) References Cited

U.S. PATENT DOCUMENTS

| | | | | |
|---|---|---|---|---|
| 2006/0093161 | A1* | 5/2006 | Falcon | H03G 3/3026 381/104 |
| 2006/0119572 | A1* | 6/2006 | Lanier | G06F 1/1601 345/156 |
| 2009/0209293 | A1* | 8/2009 | Louch | H04M 1/6041 455/566 |
| 2010/0125816 | A1* | 5/2010 | Bezos | G06F 1/1626 715/863 |
| 2010/0169819 | A1 | 7/2010 | Bestle et al. | |
| 2010/0295781 | A1* | 11/2010 | Alameh | G06F 3/0346 345/158 |
| 2011/0109619 | A1* | 5/2011 | Yoo | G06T 17/00 345/419 |
| 2011/0252358 | A1 | 10/2011 | Wilson et al. | |
| 2012/0004956 | A1* | 1/2012 | Huston | G06Q 30/0207 705/14.1 |
| 2012/0314899 | A1 | 12/2012 | Cohen et al. | |
| 2013/0097442 | A1* | 4/2013 | Lin | G06F 1/324 713/322 |

\* cited by examiner

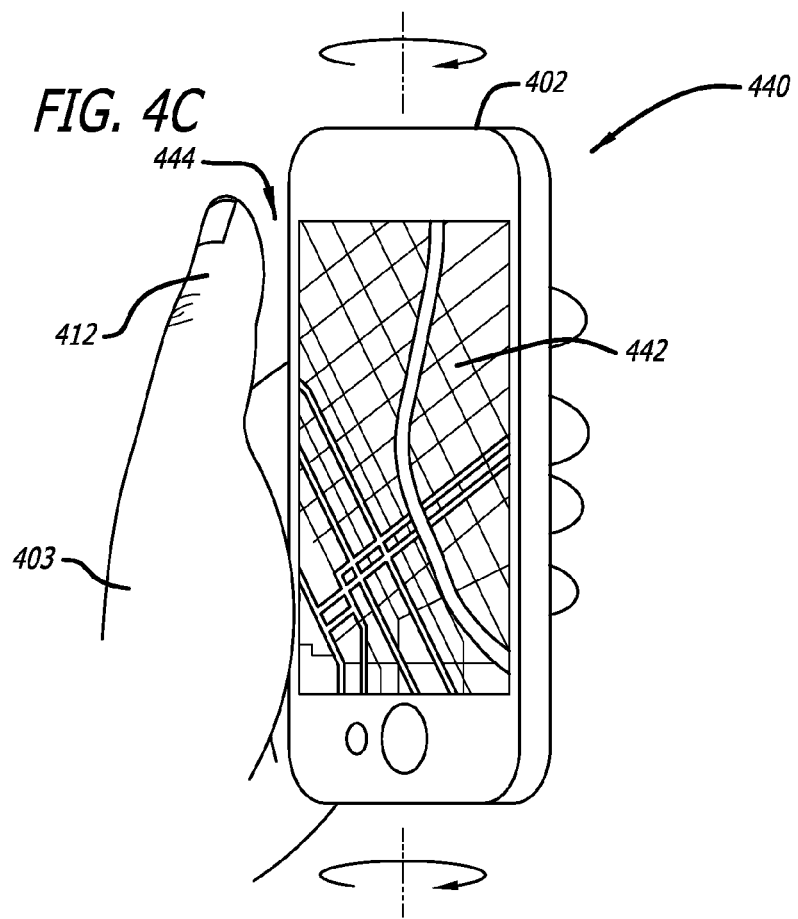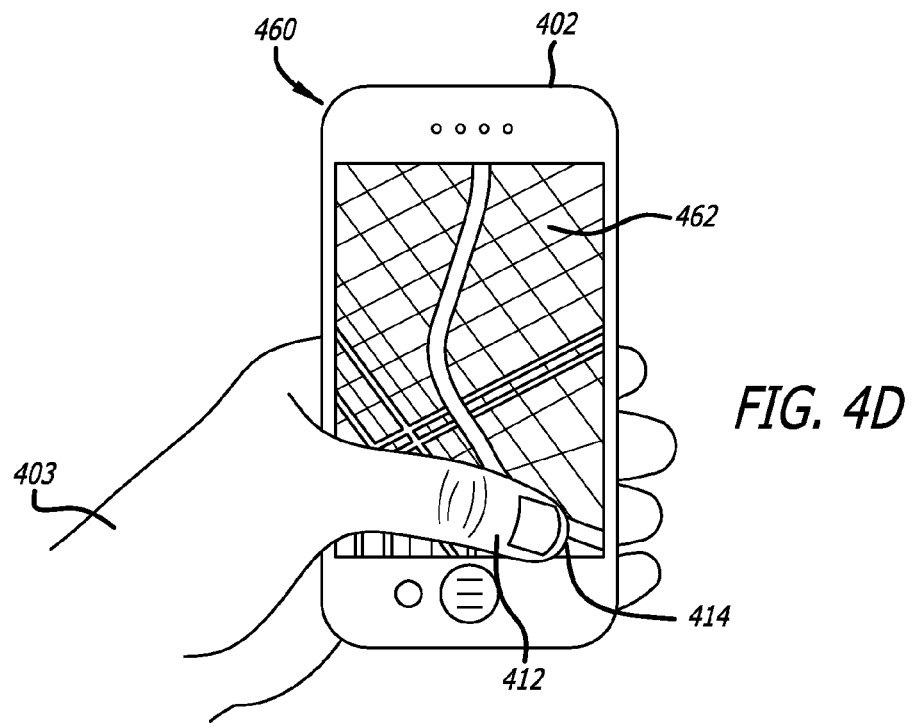

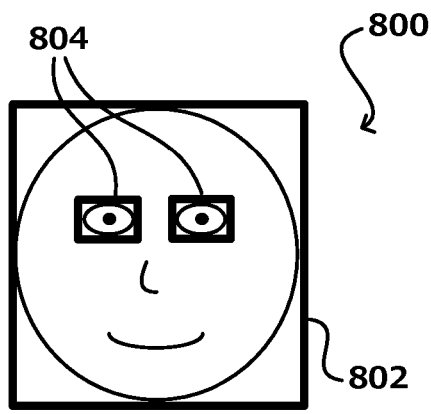 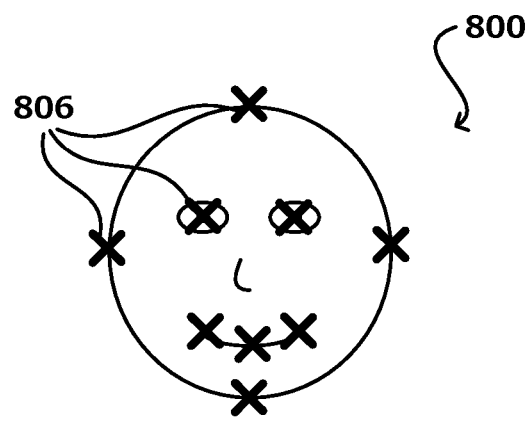
*FIG. 8A*   *FIG. 8B*
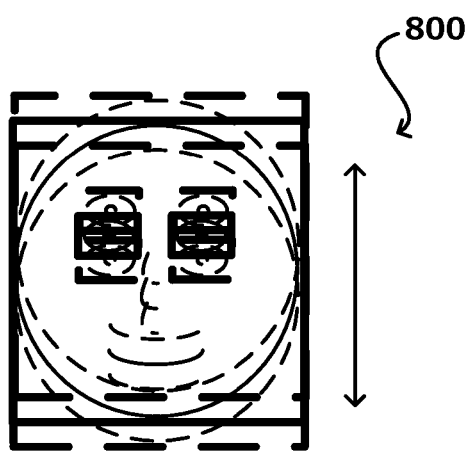 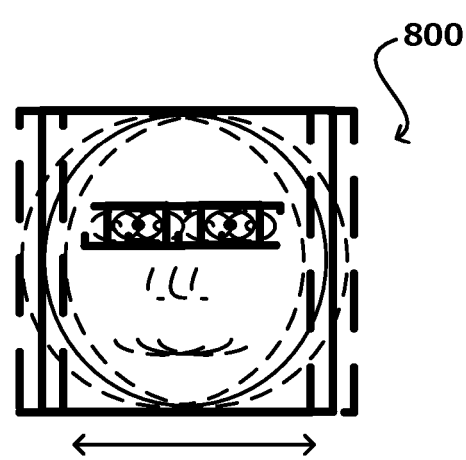
*FIG. 8C*   *FIG. 8D*

MOTION CONTROL FOR MANAGING CONTENT

CROSS-REFERENCE TO RELATED APPLICATIONS

This application claims priority to U.S. Provisional Patent Application Ser. No. 62/013,386, entitled "MOTION CONTROL FOR MANAGING CONTENT," filed Jun. 17, 2014, which is hereby incorporated herein by reference, in its entirety and for all purposes.

BACKGROUND

As computing devices offer increasing processing capacity and functionality, users are able to operate these devices in an expanding variety of ways. For example, cameras on mobile devices are capable of capturing high resolution images and delivering an image scaled or windowed to a modest resolution for further use by the user. In some instances, however, there can be an issue of how to control features that modify the image being captured or content displayed on a screen. As such, a variety of approaches to enable and/or control these features have been offered on these devices, such as virtual buttons on the screen of the computing devices or re-purposed physical buttons. Other approaches include, for example, touch-based gesture input where a user touches a touch-sensitive surface with two fingers and pinches the fingers together or apart to scale an image on a screen. Oftentimes, however, a user may be unable to perform a two finger gesture when attempting to hold and operate a device with only one hand. As technology evolves and as the features offered on computing devices expand, the way in which users interact and control these devices is changing.

BRIEF DESCRIPTION OF THE DRAWINGS

Various embodiments in accordance with the present disclosure will be described with reference to the drawings, in which:

FIGS. 4A-4D illustrate an approach to activating a content control mode to pan content displayed on a computing device in accordance with an embodiment;

FIGS. 8A-8F illustrate example approaches to determining head position that can be used in accordance with various embodiments;

DETAILED DESCRIPTION

Figures 1A, 1B, 1C:
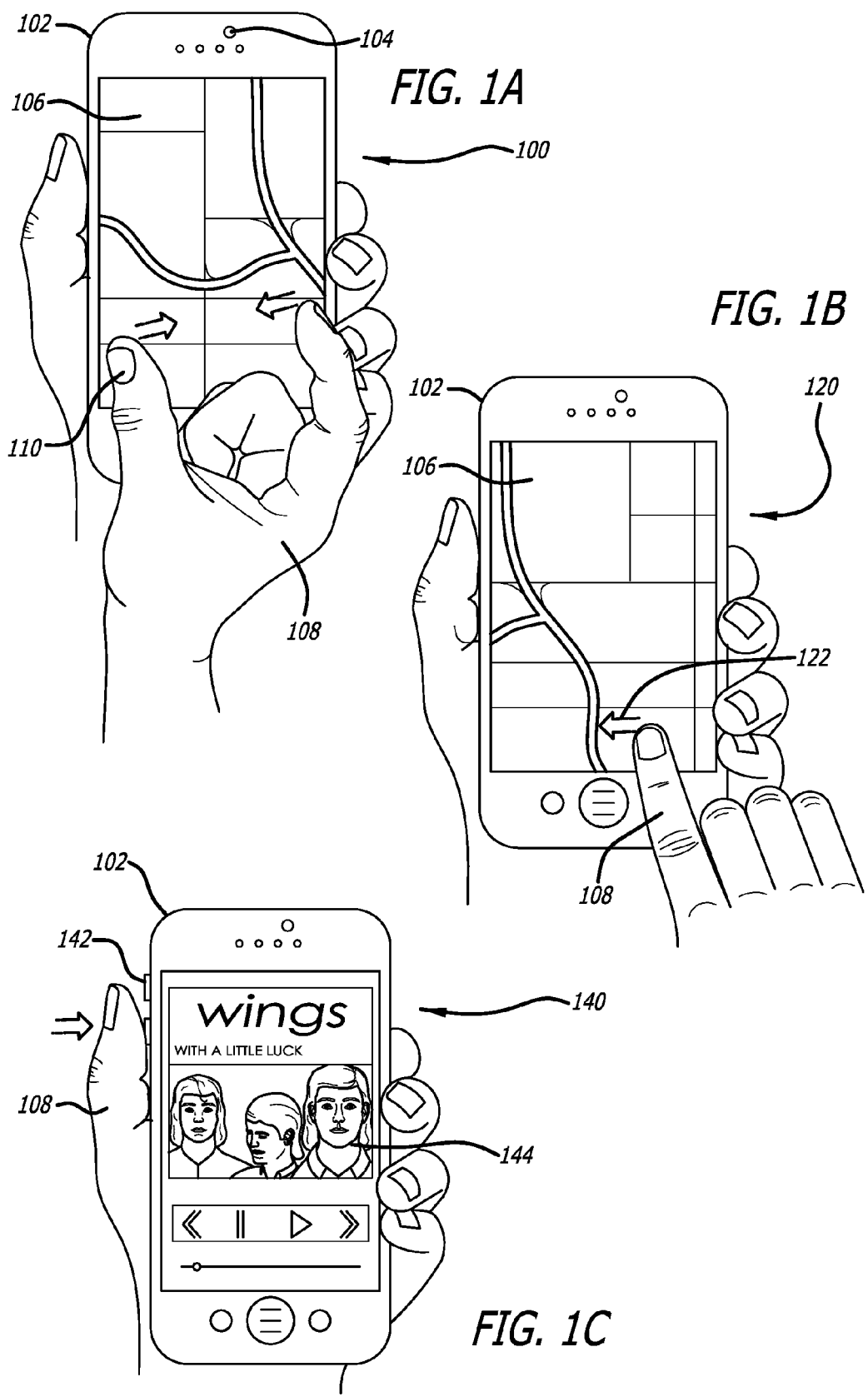
FIGS. 1A, 1B, and 1C illustrate an example implementation where a user is performing a touch-based gesture input to adjust content provided by computing device in accordance with various embodiments.

Systems and methods in accordance with various embodiments of the present disclosure may overcome one or more of the foregoing or other deficiencies experienced in conventional approaches for managing content (e.g., image, video, audio). In particular, various embodiments enable single-handed approaches managing content provided by a computing device. In accordance with an embodiment, the computing device (e.g., a mobile phone) or other portable computing device can detect a touch-based gesture input (e.g., a tap and hold) on a display screen or other area of the device, or other touch-based gesture input (e.g., pressure input, etc.) in a particular pattern in order to activate a content control mode (e.g., a zoom control mode, a panning control mode, a volume control mode). As the device is moved relative to user of the device or some other reference point, the device can cause a zooming, panning, or audio function to be executed. In this way, as the user holds the device and tilts, rotates, or otherwise changes the orientation of the device, or as the user's relative position or orientation changes with respect to the device, the content can appear to be zoomed-in or zoomed-out on, panned, or otherwise adjusted based at least in part on the function executed.

For example, in accordance with an embodiment, when operating in a zoom control mode and in response to a change in the relative position of the device, a portion of content being displayed on the computing device can be adjusted by zooming-in or zooming-out on the content. For example, in accordance with various embodiments, an image or other content can be displayed on an interface or display screen of a computing device. The image can be acquired using one or more camera or other sensor(s) of the computing device. The content can be generated from any number of applications, such as a mapping application, a web browser, etc. An activation gesture or touch-based gesture input being performed by a viewer of the computing device (such as a tap and hold on a display screen of the computing device) can be detected. Tap and hold activation gesture can refer to, for example, contacting a location of a display screen maintaining contact with the display screen. The activation gesture can be detected using a touch sensor of the computing device, the touch sensor configured to detect contact with the display screen. Information characterizing or otherwise defining the touch-based input can be provided to a device processor for processing. For example, the activation gesture can cause the device to enable the zoom control mode which can be used to adjust or otherwise modify a portion of the content being displayed on the display screen. For example, in response to a motion (such as a forward and backward motion of the device relative to a position of the user) of the device being detected relative to the viewer while concurrently maintaining contact of the finger or object used for the activation gesture, the device can adjust a portion of the image being displayed on the interface, as may include displaying a "zoomed-in" or "zoomed-out" portion of the image using the location of the touch-based gesture input as the center point.

In accordance with another embodiment, when operating in a panning control mode and in response to a change in a position of the device relative to a viewer if the device, content being displayed on the computing device can be adjusted by panning (i.e. laterally shifting or otherwise moving content up and down and/or left and right) content on the display screen. In this example, the device can detect an activation gesture (e.g., a tap and hold on a display screen of the computing device). The activation gesture can cause the device to enable a panning control mode that can be used to adjust or otherwise modify a portion of the content being displayed on the display screen. For example, in response to tilting the device (e.g., forward, backward, left, or right) relative to a viewer of the device while concurrently maintaining contact of the finger or object used for the activation gesture, the device can adjust a portion of the image being displayed on the interface, such as panning the displayed content.

In accordance with yet another embodiment, when operating in a volume control mode and in response to a change in the relative position of the device and a change in a state of the device, a volume level of audio can be adjusted. For example, the device can detect one or more activation events (e.g., a music app running and/or the display screen powering off or otherwise operating in a low power mode). The activation events can cause the device to enable the volume control mode that can be used to adjust or otherwise modify a volume of audio being played on the device. In this example, in response to a forward or backward movement of the device relative to a user of the device, the device can adjust a volume of the audio being played as may include increasing the volume as the device is pushed away from the user or decrease the volume as the device is pulled towards the user.

Various other functions and advantages are described and suggested below as may be provided in accordance with the various embodiments.

FIGS. 1A, 1B, and 1C illustrate an example implementation where a user is performing a touch-based gesture input to adjust content provided by a computing in accordance with various embodiments. As shown in situation 100 of FIG. 1A, a user 108 is performing a pinch-to-zoom touch-based gesture input 110 on a display screen 106 of a computing device 102 (such as a mobile phone or other portable computing device) to zoom in or zoom out on the displayed content. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 102 includes a camera 104 positioned on the front of the device such that the imaging element will likely be able to capture image information of at least a portion of the user while the user is viewing content displayed on the device. For example, the imaging element 104 in FIG. 1A is on the front of the device such that an angular capture range of the imaging element can image at least a portion of the user while the viewer is viewing content displayed on the display screen of the electronic device.

Using a conventional approach, if the user wants to activate a content control mode such as a zoom control mode that enables the device to "zoom-in" and/or "zoom-out" of the image or content displayed on the device, the user would typically interact with the device by selecting an icon or other selectable element such as a slider bar on the interface on the device to enable a desired content control mode. Other approaches include, for example, touch-based gesture input where a user touches a touch-sensitive surface with two fingers and pinches the fingers together or a part to scale an image or content on the display screen. For example, a user can zoom-in on the content displayed on the display screen by performing a zoom gesture that includes the user contacting the display screen at two points and separating those points by some desired distance while maintaining contact with the display screen. However, in this example, to enlarge (e.g., zoom-in) an area of content, the user has to use two hands—one hand to hold the device and another hand to perform the zoom gesture. In a similar situation, a user has to use two hands to zoom out on the content displayed on the display screen. In this example, to zoom-out on an area of content the user performs a pinch gesture that includes the user holding the device in one hand and using fingers of the other hand to contact the display screen at two separated points and bringing the two contact points together. Oftentimes, however, a user may be unable to perform a two finger gesture when attempting to hold and operate a device with only one hand.

In another situation, the user my desire to pan (i.e. lateral shift or otherwise move content up and down and/or left and right on a display screen) content displayed on the display screen to show a different geographic area. As shown in situation 120 of FIG. 1B, the user is panning across the displayed portion of the map area. Using a conventional approach, if the user wants to pan the content displayed on the device, the user would typically interact with the device by selecting an icon or other selectable element such as a slider bar on the interface on the device to pan the content. Other approaches include, for example, touch-based gesture input where a user touches a touch-sensitive surface with at least one finger and while maintaining contact with the touch-sensitive surface swipes their finger from one location to another location, as indicated by arrow 122. For example, a user can pan the content displayed on the display screen by performing a pan gesture that includes the user contacting the display screen at one point and while maintaining contact with the display screen moving the object used to make the contact around. However, in this example, to pan an area of content, the user has to use two hands—one hand to hold the device and another hand to perform the pan gesture. As described above, in some situations, however, a user may be unable to perform a gesture requiring two hands.

In yet another situation, the user may desire to adjust a volume of audio being played by the device. As shown in situation 140 of FIG. 1C, a music application 144 running on the computing device is causing audio to be played. Using a conventional approach, the user can adjust the volume of audio being played by pressing a physical (and in some instance a virtual button) 142 to adjust the volume of the audio. However, in the situation where the display screen is powered off or otherwise in a low powered state, the user may have to wake the display screen to adjust a volume of the audio. In some situations, however, it can be inconvenient to have to wake the device before adjusting a volume of the device.

Accordingly, in accordance with various embodiments, approaches enable a user to activate a single-handed content control mode to, for example, enlarge or reduce or pan displayed content as well as adjust a volume of audio being played by the device. In this way, a user of a computing device can activate a content control mode (e.g., a zoom control mode, panning control mode, volume control mode) using a single hand, for example, by tapping and holding on the display screen or otherwise perform one or more activation events. Thereafter, detecting a change in position of the device relative to a user can cause a zoom-in or zoom-out, pan, or audio function to be executed. For example, as the viewer tilts, rotates, or otherwise changes the orientation of the device, or as the viewer's relative position or orientation changes with respect to the device, the content can appear to be zoomed-in or zoomed-out on, panned, or otherwise adjusted based at least in part on the function executed.

In accordance with various embodiments, the relative movements can be based upon factors such as the distance of the viewer to the device, a direction of movement of the user, a direction of change in orientation of the device, or other such factors. In various embodiments, the relative position and/or orientation of a viewer of a computing device can be determined using at least one image capture element of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. In some situations, a sensor that is remote, separate, or otherwise in communication with the device can be used to detect a change in orientation and/or position of the device. The orientation information can be received at the device from the sensor, and the device can cause the appearance of the interface to be altered based at least in part on the received orientation and/or position information.

In at least some embodiments, a computing device can attempt to determine changes in the relative position, direction, and/or orientation between the viewer and device in order to update how the content is zoomed, panned, or otherwise adjusted. For example, the device can continue capturing and analyzing image information to attempt to determine changes in relative position of the viewer, such as may be based on movement of the viewer and/or the device. The device also can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

In this way, as the user holds the device and tilts, rotates, or otherwise changes the orientation of the device, or as the user's relative position or orientation changes with respect to the device, the content can appear to be zoomed-in or zoomed-out on, panned, or otherwise adjusted based at least in part on the function executed.

FIGS. 2A, 2B, 2C, and 2D illustrate a single-handed approach to activating a content control mode to adjust a magnification of at least a portion of content displayed on the computing device based at least in part on a position of the device relative to a viewer of the device in accordance with various embodiments. As shown in 200 of FIG. 2A, a user 203 is interacting with a map application 204 displayed on a display screen 206 of a computing device 202. Although a map application is shown, it should be noted that approaches can apply to other applications as well, as may include user interfaces, web browsers, document creation applications, etc. As shown, the user is holding the device with one hand 203 and intends to adjust a magnification of the displayed map 206 using a single-handed approach.

In this example, the user activates a content control mode (e.g., a zoom control mode) by tapping and holding on the display screen at location 214 or area of interest using a thumb 212 or other finger of the hand 203 holding the device 202. A tap and hold activation gesture can include, for example, contacting a location of a display screen and maintaining contact with the display screen. The activation gesture is active during a time the contact is maintained. When the contact is broken, the activation gesture is no longer active and any event caused by the activation gesture is terminated. It should be noted that in various embodiments, an activation gesture may not be required to activate the zoom control mode. For example, the zoom control mode can be activated automatically in response to running the application. As described, the zoom control mode can be used to, for example, enlarge or reduce displayed content or other image data. It should be noted that although the example shown in this figure illustrates a double-tap used as an activation gesture, the various embodiments described herein are not limited to this particular activation gesture. Various alternative activation movements can be used within the scope of the embodiments described herein, as will be evident to one or ordinary skill in the art, such as a double-tap, a shaking movement, moving the device away from the user, voice command, pressure input such a "squeeze input", or any other activation gesture, event, or combination thereof. Additionally, in accordance with an embodiment, depressing a button (such as a physical button, volume button, etc.) on the device can be used cause the device to activate a content control mode, such as a zoom control mode.

In accordance with an embodiment, in response to activating the zoom control mode, a scaling range can be determined. The scaling range can correspond to a range of distances relative to the user in which the zoom control mode is operable. It should be noted that in some embodiments the zoom control mode can be operable outside the scaling range, on the boundary of the scaling range, or in some other portion of the scaling range. The scaling range can be determined, for example, based at least in part on a distance of the computing device relative to the user. For example, the computing device can include a front facing camera (or other front-facing sensor such as an infrared proximity sensor), face-recognition software, and face-tracking software that can be used to detect the user relative to the device and determine between the device and the user. In one instance, the front-facing camera can be used to capture an image of the user's face, and the face-recognition software can be used by the device to determine a facial feature of the user, such as the user's eyes. Based on this determination, the device can determine a relative size of the facial feature, such as the distance between the user's eyes, and the distance between the user's eyes can be used to determine a measure of distance using techniques of photogrammetry, where the measure of distance is the distance between the detected facial feature and the device.

Additionally or alternatively, two or more cameras, face-recognition software, and face-tracking software can be used to determine the measure of distance between the user and the device. In this instance, two cameras are operating simultaneously (where the camera capture is synched between the two cameras), and the face-detection and face-tracking software is used to determine a distance to the head of the user (or to some feature of the head, such as the eyes), where the distance is determined by triangulating the features between the two cameras using stereopsis. This approach advantageously provides for a higher resolution and lower-noise signal for the range, and is independent of the user (such as the distance between the user's eyes or other measurement of the user), and is instead dependent on a known distance between the two cameras.

In accordance with an embodiment, the techniques described with respect to the photogrammetry and stereopsis can be combined to determine a measure of distance that can be used to determine a scaling range. In this way, using both techniques simultaneously can provide for a more robust method to determine a scaling range and/or a measure of distance between the device and the user, such as against events like the occasional occlusion of one of the two cameras as by a thumb or other object. It should be noted that various alternative methods to determine a scaling range are considered within the scope of the embodiments described herein, as will be evident to one or ordinary skill in the art, such as using a computing device having infrared cameras (or other sensors) to lock or otherwise detect a facial feature of a user; determine a relative distance or range of the motion as a function of distance between the targeted facial feature and the computing device, and the like.

In accordance with an embodiment, the scaling range is determined based at least in part on the measure of distance and one or more characteristics associated with the user of the device, such as arm length, average viewing distance, etc. In certain embodiments, as the user operates the device, the device can refine the scaling distance based on the user's use of the device and physical characteristics, such as arm length and the like. The user's use of the device can include, for example, a history of forward and/or a backward movement of the device to determine a range of the forward and/or the backward movement. This range can be calibrated periodically, and can be used to set a scaling range in which the content control is operable. It should be noted that in some embodiments the zoom control mode can be operable outside the scaling range, on the boundary of the scaling range, or in some portion of the scaling range.

As described, movements of the device towards or away from the user, or other user motions can cause the device to control zooming of the content displayed on the display screen of the device. In this way, the content is displayed based at least in part upon a current relative position and/or orientation of the viewer with respect to the device. For example, as shown in situation 220 of FIG. 2B, the user has moved the device from a first position 214 to a second position relative to the user 201 while concurrently maintaining contact of the finger or object used for the activation gesture. As shown, the movement can correspond to moving the device closer to the user as illustrated by arrow 222. In this situation, the relative distance between the user and the computing device has decreased.

Figure 2A:
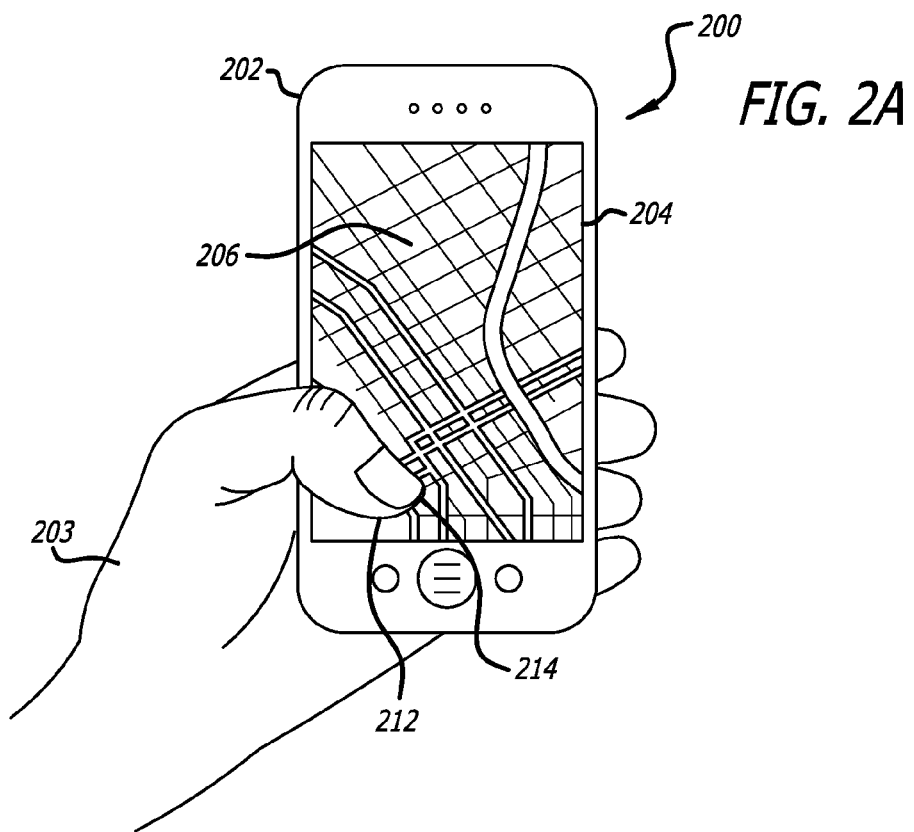
FIGS. 2A-2F illustrate an approach to activating a content control mode to adjust a magnification of at least a portion of content displayed on the computing device in accordance with an embodiment.
Figure 2B:
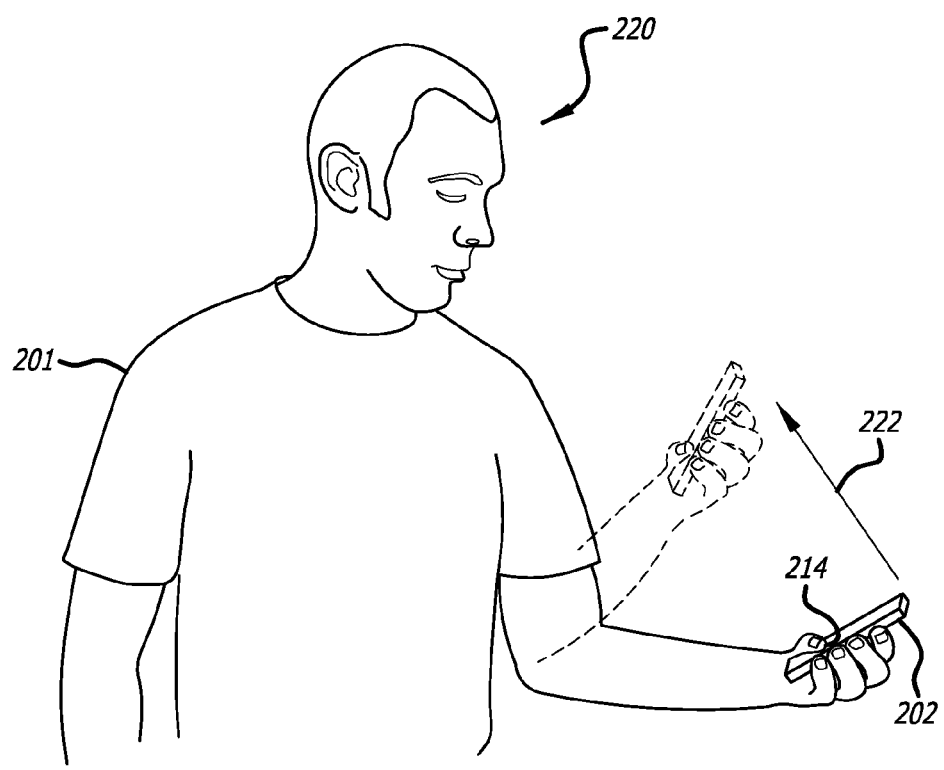
Figure 2C:
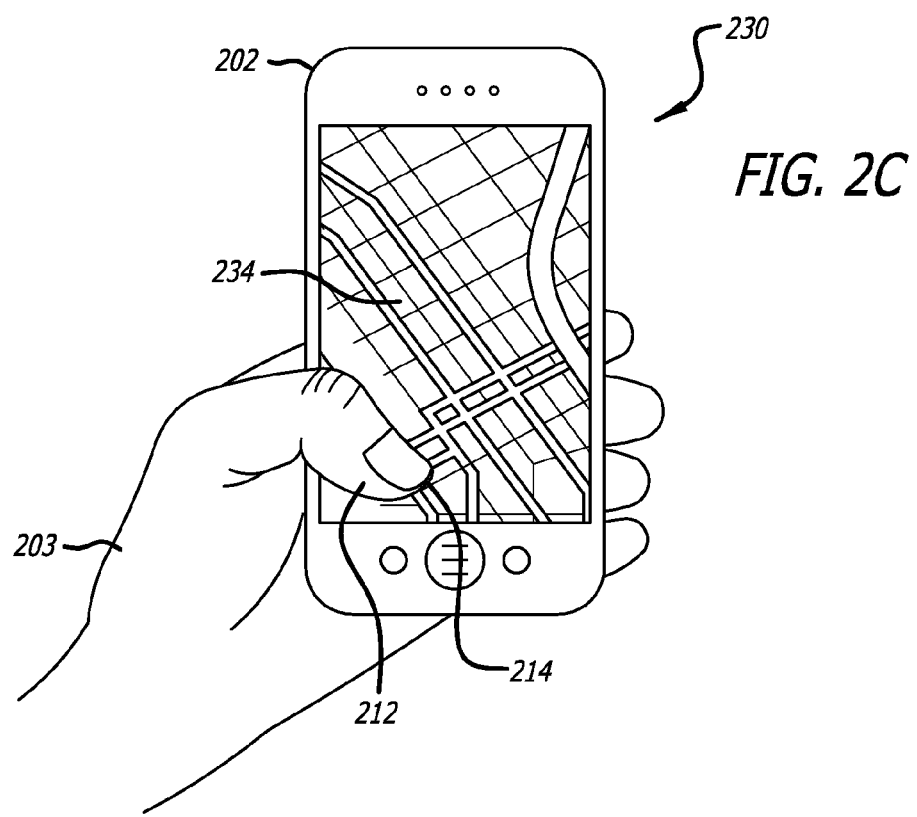
Figure 2D:
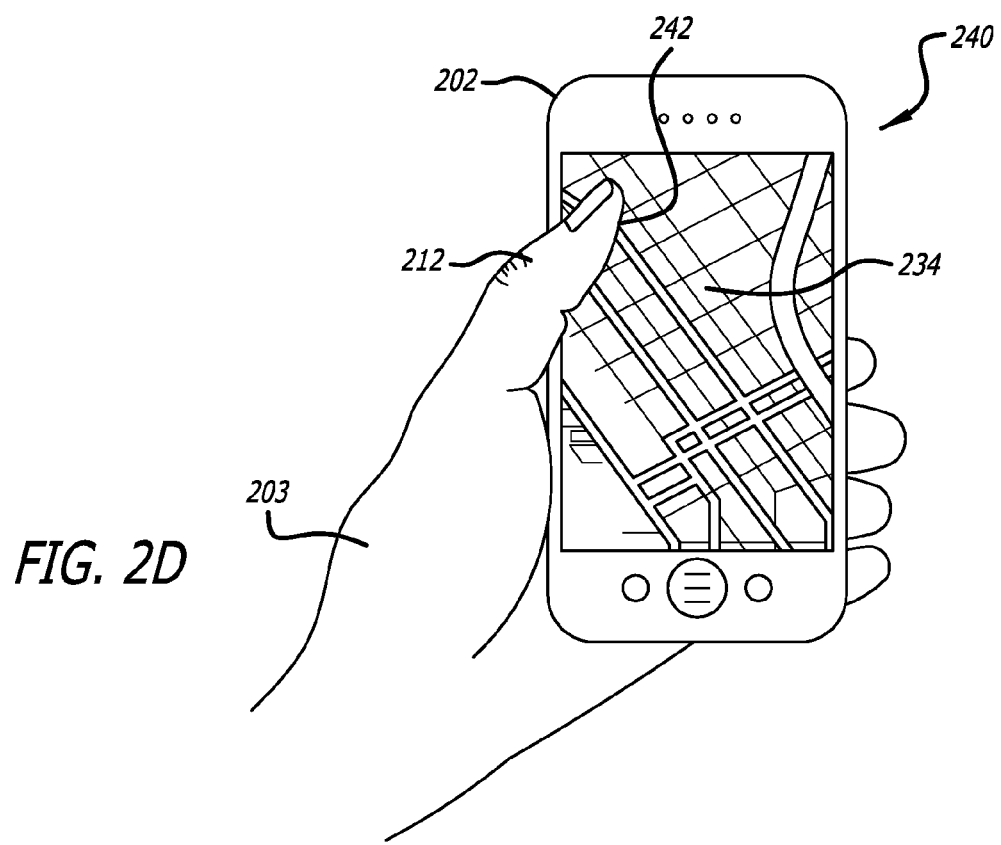

As shown in situation 230 of FIG. 2C, in response to moving the device towards the user while concurrently maintaining contact of the finger or object used for the activation gesture, the device can zoom-in on the displayed map using the location of the touch-based gesture input as the center point of the zooming. In this way, the content is zoomed-in around where the user's finger contacts the display screen of the device. For example, as illustrated in FIG. 2C, the movement of the device 202 triggered a change in the map information displayed on the device. In this example, instead of seeing the view of the map in FIG. 2A, the map view includes an enlarged view of the map 234 centered proximate to location 214 (e.g., the area where the user's finger 212 contacted the display screen). In accordance with an embodiment, zooming-in can display additional information. For example, in the displayed maps application, zooming-in can show additional streets, places of interest such as restaurants, attractions, etc., can cause the text size of map labels to increase, among other such features and actions.

In various situations the user may desire to zoom-out on a different area of interest. For example, as shown in example 240 of FIG. 2D, the user is taping and holding a different location 242 or area of interest on the map. In this example, the user activates a content control mode (e.g., a zooming control mode) using by tapping and holding on the display screen at location 242 or area of interest using a thumb 212 or other finger of the hand 203 holding the device 202. Since the user has not yet changed a magnification of the displayed map content, the displayed map 234 is the same as that in FIG. 2C.

Figure 2E:
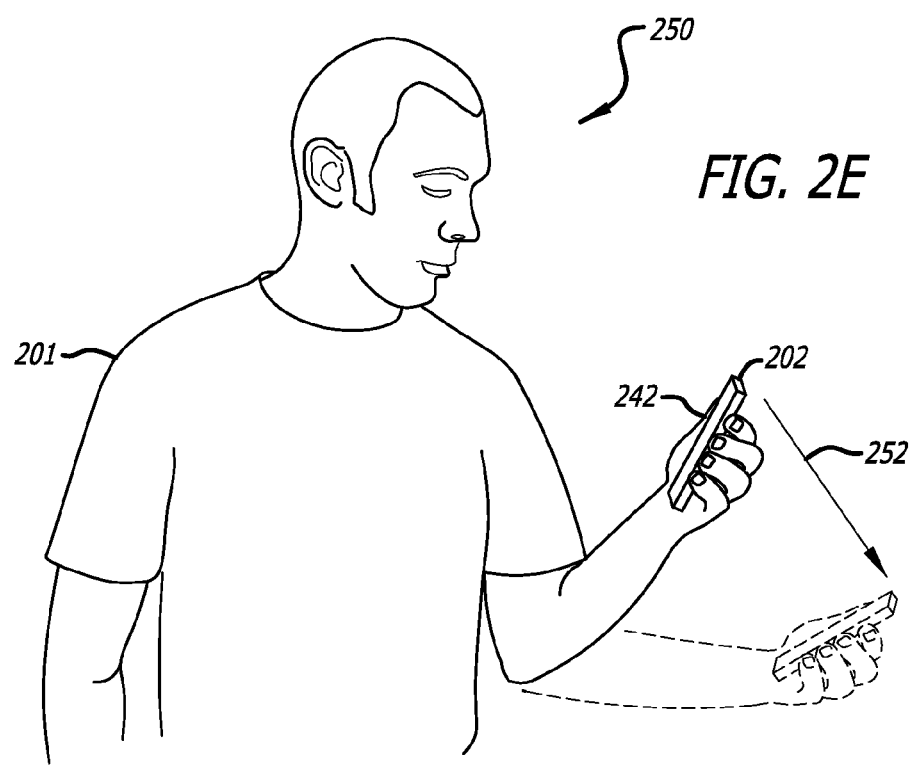

As described, movements of the device towards or away from the user, or other user motions can cause the device to control zooming of the content displayed on the display screen of the device. For example, as shown in situation 250 of FIG. 2E, the user 201 has moved the device from a first position 242 to a second position relative to the user 201 while concurrently maintaining contact of the finger or object used for the activation gesture. As shown, the movement can correspond to moving the device away from the user as illustrated by arrow 252. In this situation, the relative distance between the user and the computing device has increased. Accordingly, as the user pulls the device away while concurrently maintaining contact of the finger used for the activation gesture, as shown in example 250 of FIG. 2E, the device can cause the content displayed to be zoomed-out on.

Figure 2F:
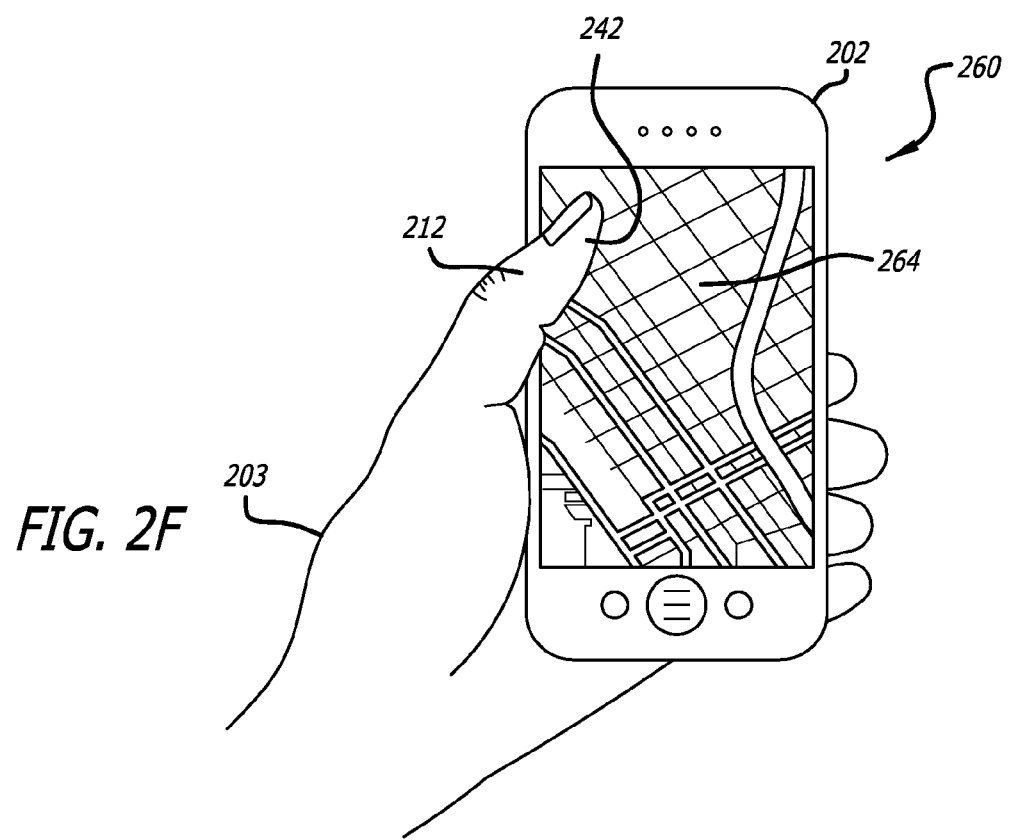

For example, as shown in situation 260 of FIG. 2F, in response to moving the device 202 away from the user while concurrently maintaining contact of the finger 212 used for the activation gesture at the area of interest 242, the device can zoom-out on the displayed map using the location 242 of the touch-based gesture input as the center point of the zooming. In this way, the content is zoomed-out around where the user's finger contacts the display screen of the device. In accordance with various embodiments, zooming-out can include displaying additional content on the display screen. For example, in a maps application additional geographic area 264 can be displayed.

In accordance with various embodiments, zooming can include, for example, decreasing the percentage the image shown at any given time or increasing the display size of a portion of an image or taking information from a subset of pixels and causing that information to be displayed over a larger region of the screen. In the situation where a user "zooms in", the user moves the device towards the object, and the device modifies the image displayed on the interface by, e.g., sub-sampling and cropping the image up to a max crop factor, where the max crop factor can be tailored to the display of the device. For example, if the display of the device is 1 MP, then the device would crop the image one-to-one. In the situation where a user "zooms out", the user moves the devices away from the object and towards the user, which causes the device to modify the image displayed on the interface by, e.g., displaying the entire object by using all the available pixels. Accordingly, in accordance with various embodiments, the device can perform any combination of cropping and subsampling to produce the feel of smooth optical zooming by manipulating pixels.

Figure 3:
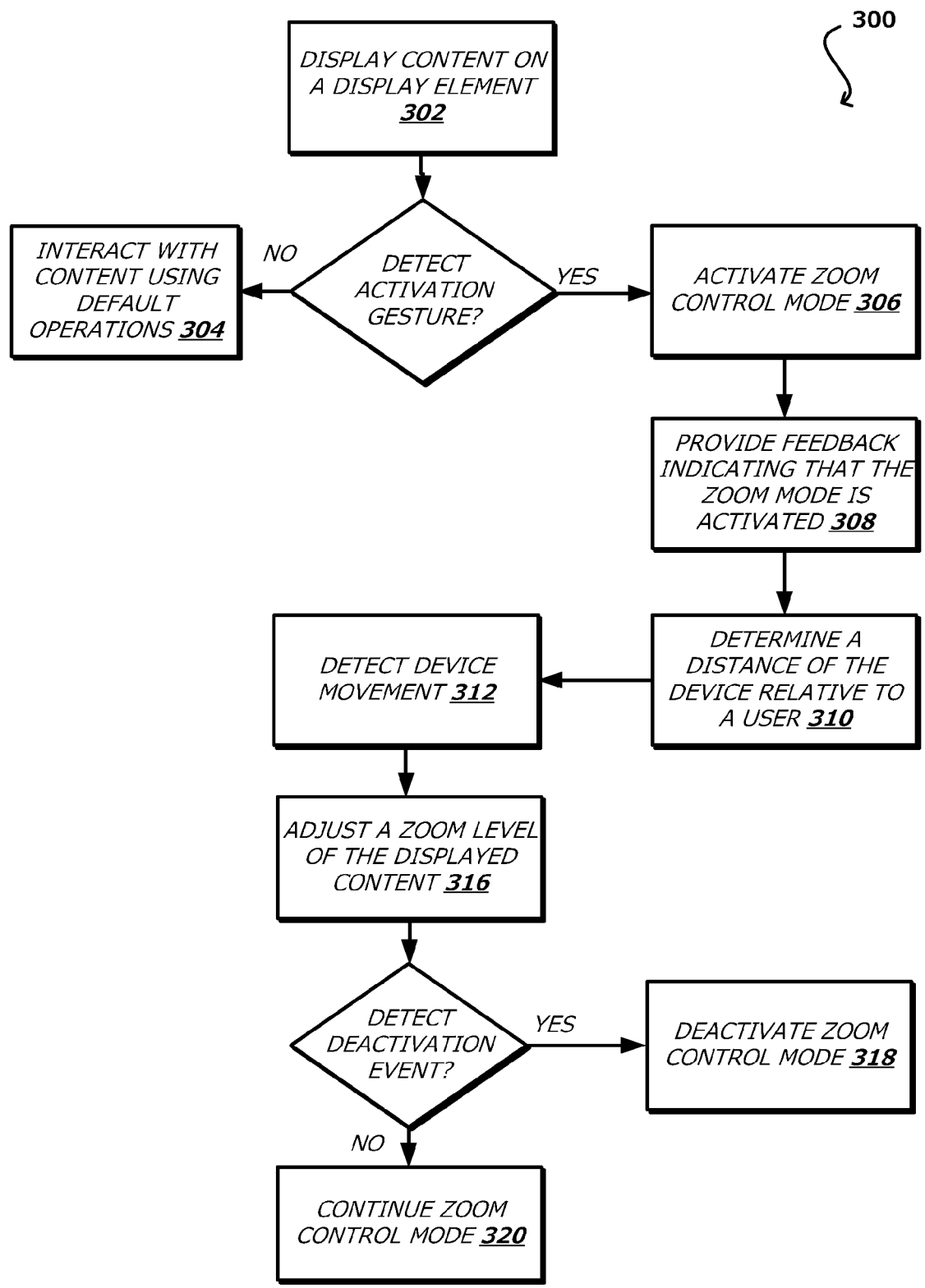
FIG. 3 illustrates an example process for controlling an appearance of content as may include adjusting a magnification of a portion of the content in accordance with various embodiments.

FIG. 3 illustrates an example process for controlling an appearance of content as may include adjusting a magnification of a portion of the content in accordance with various embodiments. It should be understood that, for any process described herein, that there can be additional or fewer steps performed in similar or alternative orders, or in parallel, within the scope of the various embodiments unless otherwise stated. As described, approaches for managing a display of content, via an electronic device are provided. In particular, various embodiments enable single-handed approaches to magnifying content displayed on a display screen of a computing device. For example, content (e.g., an image, video, application data) is displayed 302 on a display screen of a computing device. The image can be acquired using one or more camera or other sensor(s) of the computing device. The content can be generated from any number of applications, such as from a mapping application, a web browser, etc. In the situation where no activation gesture is detected, the content control mode (e.g., zoom control mode) is not activated and the viewer can view or otherwise interact 304 with the content in accordance with one or more default operations. In the situation where an activation gesture is detected, such as when a touch-based gesture input is detected on an area of interest on the content, a zoom control mode is activated 306. Activating the zoom control mode can include, for example, detecting a tap and hold on the display screen. It should be noted that in various embodiments, an activation gesture may not be required to activate the zoom control mode. For example, the zoom control mode can be activated automatically in response to running the application.

In accordance with various embodiments, feedback indicating that the zoom control mode is activated can be provided 308. In accordance with various embodiments, feedback can include displaying a graphical element on the display screen of the computing device on the area of interest, where the graphical element can indicate that the zoom control mode is activated. In various other embodiments, feedback can include audio and/or haptic indications. For example, a sound can be generated by a speaker of the computing device, or a haptic response can be generated by a component of the computing device. A distance of the computing device with respect to a viewer of a display screen of the computing device can be determined 310 based at least in part on an image acquired by the camera or distance information acquired by a distance sensor of the computing device.

A change in position or movement of the computing device relative to a viewer of the display screen over a predetermined scaling range is detected 312. In various embodiments, the relative position and/or orientation of a viewer of a computing device can be determined using at least one image capture element of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. For example, the device can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

Based at least in part on the change in position of the computing device, a zoom level of the content being displayed is adjusted 316 around the area of interest. Accordingly, in response to a motion (such as a forward and backward motion of the device relative to a position of the user) of the device being detected relative to the viewer while concurrently maintaining contact of the finger or object used for the activation gesture, the device can adjust a portion of the image being displayed on the interface, as may include displaying a "zoomed-in" or "zoomed-out" portion of the image using the location of the touch-based gesture input as the center point.

In accordance with various embodiments, the zoom control mode can be deactivated in response to one or more deactivation events. For example, in response to detecting a release of the tap and hold of the touch-based gesture input, the zoom control mode can be deactivated 318. In such a situation, the content displayed can be remain in the current state or zoom level, return to a default zoom, or be return to some other zoom level. In the situation where zoom events are detected within the predetermined period of time, the zoom control mode remains activated and the viewer can continue zooming 320. Various other approaches can be used as well to deactivate the content control mode, as may include a double-tap input-based gesture, shaking the device, a voice command, an input-based gesture that includes pressing a physical button, or some other event.

In accordance with an embodiment, the activation movement can cause the device to enable other content control modes, such as a panning control mode. As described, the panning control mode can be used to, for example, pan (i.e. move or scroll content up and down and/or left and right on a display screen) content displayed on a computing device. For example, when operating in the panning control mode and in response to a change in a position of the device relative to a viewer of the device, content being displayed on the computing device can be adjusted by moving content across the display screen. In this way, content (e.g., text, images video, etc.) can appear to slide across the display screen, vertically and/or horizontally. Panning, as such, does not change the layout of the content, but moves (pans or tilts) the user's view across what is apparently a larger image that is not wholly seen. For example, in the situation where content is too wide to fit on a display, such as in the case of a map, horizontal panning may be used to view portions of the map not displayed on the display screen. Similarly, in applications such as graphics and spreadsheets there is often more content than can fit either the width or the height of the display screen, and panning in both directions may be used to view the additional content. In this way, panning content can refer to, for example, horizontal and/or vertical scrolling of an image that is wider than the display. In particular, in response to a change in a position of the device relative to the viewer, the content can be moved up or down and/or left or right on the display screen. This can include, for example, scrolling the content in one of a number of different directions and as the content is scrolled, additional or new content can be displayed.

For example, FIGS. 4A, 4B, 4C, and 4D illustrate a single-handed approach to activating a content control mode to pan (i.e. moving content up and down and/or left and right on a display screen) at least a portion of content displayed on the computing device based on a position of the device relative to a viewer of the device in accordance with various embodiments. As shown in 400 of FIG. 4A, a user is interacting with a maps application displayed on a display screen of a computing device 402. As shown, the user is holding the device with one hand 403 and intends to pan the displayed map 404 using a single-handed approach. In this example, the user activates a content control mode (e.g., a panning control mode) using by tapping and holding on the display screen at location 414 using a thumb 412 or other finger of the hand 403 holding the device 402. It should be noted that in various embodiments, an activation gesture may not be required to activate the panning control mode. For example, the panning control mode can be activated automatically in response to running the application.

As described, the panning control mode can be used to, for example, pan content or other image data. For example, in accordance with an e embodiment, when operating in the panning control mode and in response to a change in the relative position of the device (e.g., a right, left, forward, or backward tilt), a portion of content being displayed on the computing device can be adjusted by panning the content. For example, in accordance with various embodiments, the device can detect an activation gesture (e.g., a tap and hold on a display screen of the computing device). The activation gesture can cause the device to enable a panning control mode that can be used to adjust or otherwise modify a portion of the content being displayed on the display screen.

Figure 4A:
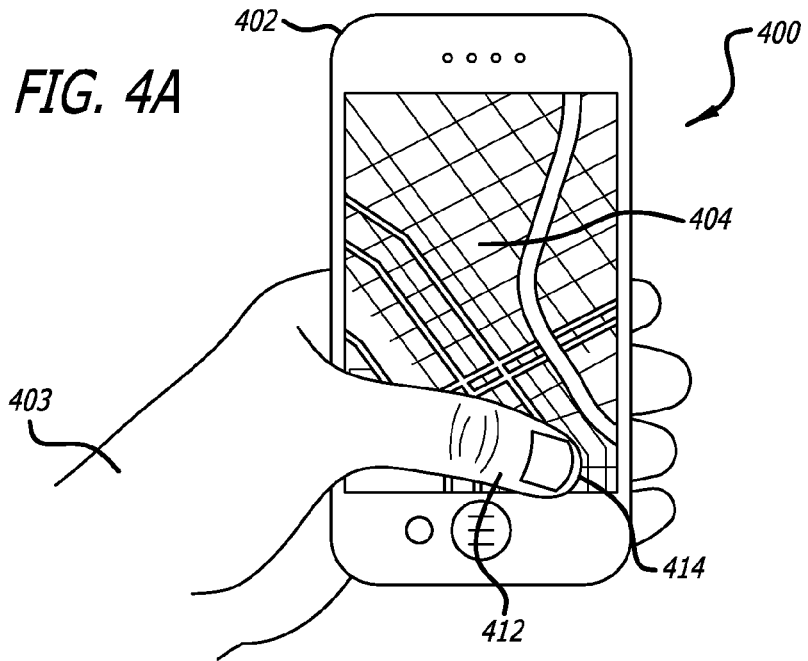
Figure 4B:
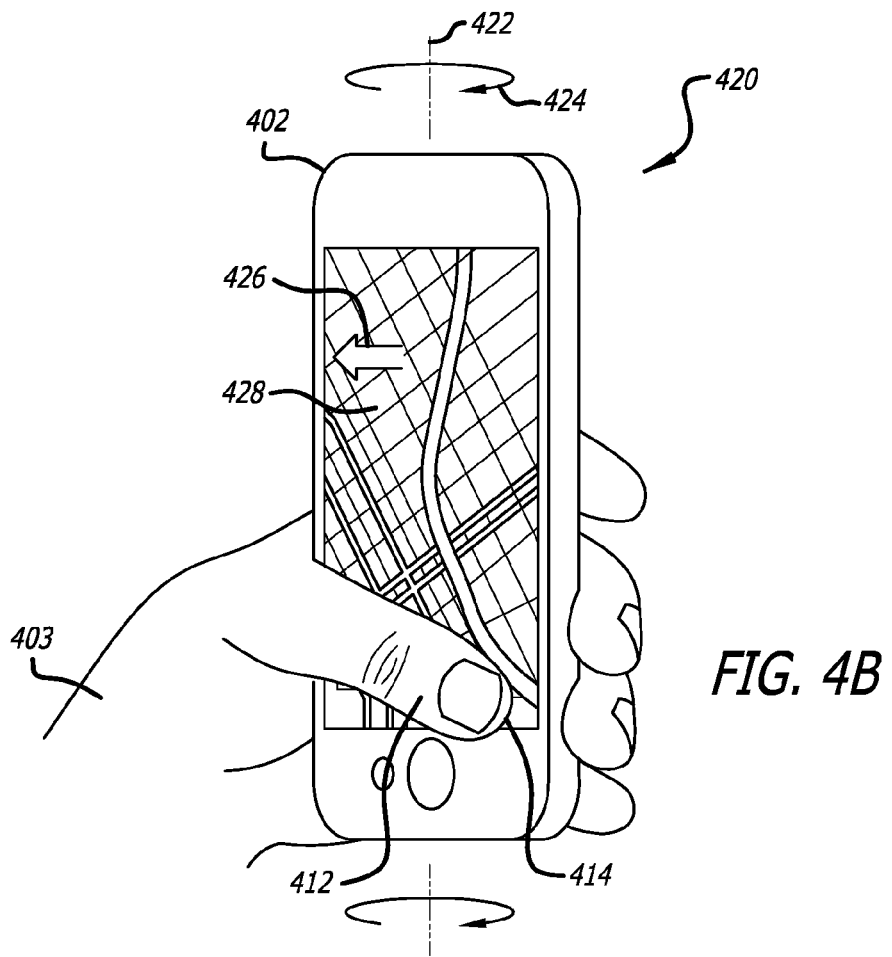

For example, as shown in example 420 of FIG. 4B, in response to tilting or rotating the device as shown and while concurrently maintaining contact at the location 414 of the finger 412 or object used for the activation gesture, the device can cause the map application to pan to the left. In this example, as the user rotates the device about an axis 422, such as in a clockwise direction 424, the map content can be panned or otherwise laterally shifted towards a direction corresponding to the clockwise rotation, e.g., to the left as shown by arrow 426. In this example, as the map content is panned, a different geographic area 428 can be displayed.

In accordance with an embodiment, the axis 422 can be an imaginary line going through the device, such as from the bottom of the device through the top of the device and parallel to the display screen. Rotating or otherwise tilting the device clockwise or counterclockwise about the axis can cause the device to pan the displayed content accordingly. For example, when the panning control mode is activated, rotating the device clockwise can cause the map content to be panned to the left and rotating counterclockwise about the axis can cause the map content to be panned or otherwise laterally shifted towards a direction corresponding to the counterclockwise rotation, e.g., to the right.

In accordance with an embodiment, as the user tilts the device away from user, such as by rotating along a primary axis of the device, the device can modify the map content displayed on the interface by, e.g., panning towards the top of the device to see addition map content. In a maps application, this can include displaying a different geographic area. As the user tilts the device towards the user, the device can, for example, pan towards the bottom of the device to see additional map content. In accordance with various embodiments, the primary axis can be perpendicular to axis 422 and parallel to the display screen.

In certain embodiments, panning can occur in response to a threshold amount of tilt being detected for at least a predetermined period of time. For example, when the device is tilted at least a threshold angle and maintains that position for a predetermined period of time, a panning operation is applied to the content displayed on the display screen. In various embodiments, such an approach may only apply to an initial threshold, wherein changes in the angle of the device greater than the initial threshold result in substantially immediate changes in the amount of panning. As the relative position of the viewer and/or orientation of the device changes, the updated position information can used to adjust the amount of pan applied to the content. For example, the speed of panning can be controlled by the angle at which the device is tilted (e.g., shallow=slower, steep=faster). Accordingly, the pan amount corresponds to changes in the relative angle, or position of the viewer relative to the device.

For example, there can be a plurality of discrete pan levels, where each pan level can correspond to an amount of tilt of the device. For example, an amount of tilt reaching a first threshold can cause the device to pan a first amount and an amount of tilt reaching a second threshold can cause the device to pan a second amount. In this example, the first amount of panning can be greater than the second amount of panning. The threshold can be any defined threshold. For example, the first threshold can correspond to a tilt of 10 degrees and a second threshold can correspond to a tilt of 15 degrees. There can be any number of thresholds as well as corresponding panning amounts or factors associated with each threshold.

In accordance an alternate embodiment, the device can enter a continuous panning control mode. For example, as described, a pan amount can be based on the amount of tilt of the device relative to a reference point, where in response to tilting the device relative to the reference point, the amount of pan can be adjusted. This can be considered an absolute panning control mode. In a continuous panning control mode approach, tilting the device more than a threshold amount from a reference point can activate continuous panning, where the device continues to pan at a determined rate until the device is titled back in the starting position. For example, when the device is tilted at least a threshold angle, a panning operation is applied to the content displayed on the display screen where the device continues to pan the content until the device is positioned in the starting position. Accordingly, if the user tilts the device more than a threshold angle relative to a reference point, the content will panned until the device is returned to the starting position. Further, in accordance with various embodiments, the rate of continuous pan can be based on an amount of tilt. For example, an amount of tilt reaching a first threshold can cause the device to pan the content continuously at a first rate of pan and an amount of tilt reaching a second threshold can cause the pan to adjust at a second rate of pan.

In accordance with various embodiments, the reference point can be determined in a number of ways. For example, the reference point can be determined using image information acquired using at least one camera of the device or position information of the device acquired using at least one device sensor (e.g., a gyroscope, an accelerometer, etc.). When determining the reference point using image information, in response to activating the panning control mode, one or more images can be analyzed to determine an angle of the viewer's head relative to the device. The angle can be the reference point and can correspond to a horizontal axis running through the device and parallel to the screen. Tilting the device is rotating about the horizontal axis. Similarly, tilting can be about a vertical axis perpendicular to the horizontal axis. For example, in the situation where a user pans the map content or other content towards the bottom, the user tilts the device towards the user such as by rotating along the horizontal axis of the device.

In the situation where a device sensor is used to establish the reference point, in response to activating the panning control mode, at least one of the gyroscope or the accelerometer can be used to determine an initial position. The initial position can correspond to a horizontal axis running through the device and parallel to the screen and tilting the device is rotating about the horizontal axis or a vertical axis perpendicular the horizontal axis. In this way, the device can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

In accordance with various embodiments, the panning control mode can be deactivated in response to one or more events. For example, as shown in example 440 of FIG. 4C, in response to finger 412 being removed from the display screen as illustrated by space 444, the content control mode can be deactivated. In such a situation, at least one other function configured to control a display of the content can be activated. The other function can include, for example, touch-based inputs such as tap and drag and other touch-based inputs known in the art. Additionally or alternatively, the content displayed can remain in the current state 442 or be return to some other state. Various other approaches can be used as well to deactivate the content control mode, as may include a double-tap input-based gesture, shaking the device, a voice command, an input-based gesture that includes pressing a physical button, or some other event.

In another situation, the user can stop panning when the device is returned to the reference position or initial position. For example, as shown in example 460 of FIG. 4D, the user is maintaining contact at location 414. As such, the panning content mode is active. In this situation, however, because the user has returned the device to the reference position, panning stops. In such a situation, the content displayed can remain in a current state 462. The current state can correspond to the geographic area that was last displayed or panned to. As described, in response to tilting the device (e.g., forward, backward, left, or right) while concurrently maintaining contact of the finger or object used for the activation gesture, the device can pan the content displayed on the map application.

In accordance with various embodiments, any of a number of elements can be used to determine changes in relative position and/or orientation between a user and a computing device. As described, the device can include an imaging element that can be used to capture image information for determining a relative position or direction of a user as mentioned above. When using a camera to determine a relative position of a user, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. Accordingly, in some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, electronic compasses, and the like. Other input elements, such as microphones or proximity sensors, can be used as well in other embodiments. The information from at least some of these elements can be analyzed to determine that the device is tilting forward or backward and to determine an amount or angle or tilt as the device is tilted. By determining the amount of tilt, for example, the device can adjust how much the content is panned.

Figure 5:
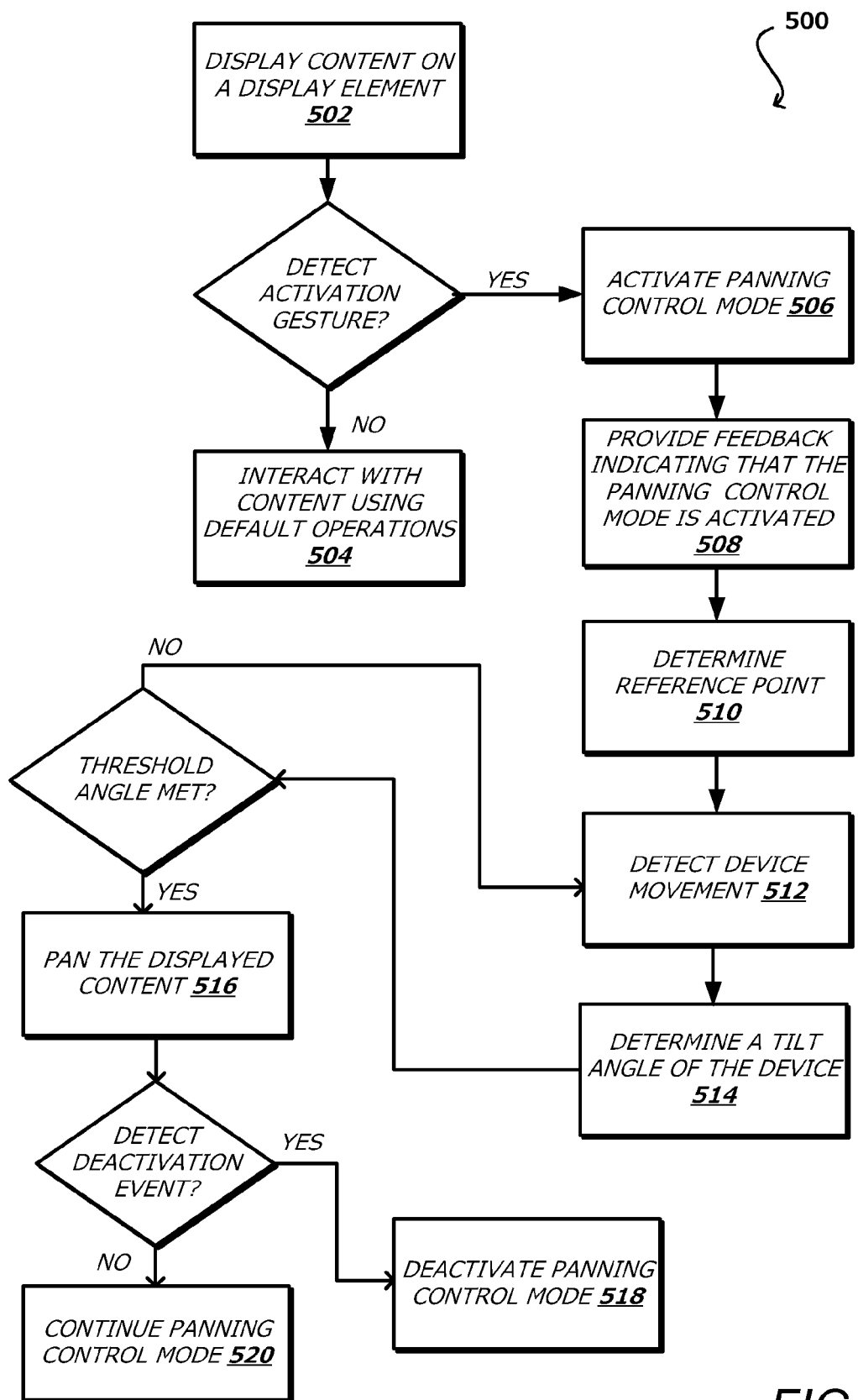
FIG. 5 illustrates an example process for controlling an appearance of content as may include panning content displayed on a computing device in accordance with various embodiments.

FIG. 5 illustrates an example process for controlling an appearance of content as may include panning content displayed on a computing device in accordance with various embodiments. In this example, content is displayed 502 on a display screen of a computing device. In the situation where no activation gesture is detected, the content control mode (e.g., panning control mode) is not activated and the viewer can view or otherwise interact with the content in accordance with one or more default operations. In the situation where an activation gesture is detected, such as when a touch-based gesture input is detected on an area of interest on the content, a panning control mode is activated 506. Activating the panning control mode can include, for example, detecting a tap and hold on the display screen. It should be noted that in various embodiments, an activation gesture may not be required to activate the panning control mode. For example, the panning control mode can be activated automatically in response to running the application.

In accordance with various embodiments, feedback indicating that the panning control mode is activated can be provided 508. As described, feedback can include displaying a graphical element on the display screen of the computing device on the area of interest, where the graphical element can indicate that the panning control mode is activated. In various other embodiments, feedback can include audio and/or haptic indications. For example, a sound can be generated by a speaker of the computing device, or a haptic response can be generated by a component of the computing device. A reference point of the computing device with respect to a viewer of a display screen of the computing device can be determined 510 based at least in part on an image acquired by the camera or distance information acquired by a distance sensor of the computing device. As described, as the device is moved relative to user around the reference point, the device can cause a panning function to be executed. In accordance with various embodiments, the reference point can be determined in a number of ways. For example, the reference point can be determined using image information acquired using at least one camera of the device or position information of the device acquired using at least one device sensor (e.g., a gyroscope, an accelerometer, etc.). When determining the reference point using image information, in response to activating the panning control mode, one or more images can be analyzed to determine an angle of the viewer's head relative to the device. The angle can be the reference point and can correspond to a horizontal axis running through the device and parallel to the screen. In the situation where a device sensor is used to establish the reference point, in response to activating the panning control mode, at least one of the gyroscope or the accelerometer can be used to determine an initial position. The initial position can correspond to a horizontal axis running through the device and parallel to the screen and tilting the device is rotating about the horizontal axis or a vertical axis perpendicular the horizontal axis.

A change in position or movement of the computing device relative to a viewer of the display screen over a predetermined scaling range is detected 512. As described, the relative position and/or orientation of a viewer of a computing device can be determined using at least one image capture element of the device. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations.

Based at least in part on the change in position of the computing device, a tilt angle of the computing device with respect to the viewer is determined 514 and the content displayed is panned 516 based at least in part on the angle meeting at least a threshold angle. Accordingly, panning occurs when a threshold amount of tilt is detected for at least a predetermined period of time. For example, when the device is tilted at least a threshold angle and maintains that position for a predetermined period of time, a panning operation is applied to the content displayed on the display screen. In various embodiments, such an approach may only apply to an initial threshold, wherein changes in the angle of the device greater than the initial threshold result in substantially immediate changes to the amount of content panned. As the relative position of the viewer and/or orientation of the device changes, the updated position information can used to pan the content. For example, a forward tilt of the device relative to a user holding the device can cause the content displayed on the device to be panned or otherwise lateral shifted towards a direction corresponding to the forward tilt, e.g., the bottom of the device, while a backward tilt of the device relative to the user can cause the content displayed on the device to be panned or otherwise lateral shifted towards a direction corresponding to the backward tilt, e.g., the top of the device.

In accordance with various embodiments, the panning control mode can be deactivated in response to one or more events. For example, in response to removing contact of the finger or object used to activate the panning control mode, the panning control mode can be deactivated 518. In such a situation, the content displayed can be remain in the current state or be return to some other state. Various other approaches can be used as well to deactivate the panning control mode, as may include a double-tap input-based gesture, shaking the device, a voice command, an input-based gesture that includes pressing a physical button, or some other event. In another situation, the user can stop panning when the device is returned to the reference position or initial position. For example, in the situation the user has returned the device to the reference position, panning stops. In such a situation, the content displayed can remain in a current state. The current state can correspond to the geographic area that was last displayed or panned to. As described, in response to tilting the device (e.g., forward, backward, left, or right) while concurrently maintaining contact of the finger or object used for the activation gesture, the device can pan the content displayed on the map application. In the situation where no deactivation event is detected, the panning control mode remains activated and the viewer can continue panning content 520.

FIGS. 6A-6D illustrate a single-handed approach to activating a control mode to adjust a volume level of a computing device, in accordance with various embodiments. As shown in situation 600 of FIG. 6A, a user is interacting with a music application 606 displayed on a display screen of a computing device 602. In this example, in accordance with an embodiment, the user is attempting to activate a volume control mode to adjust a volume of audio being played on the computing device. As described, when operating in a volume control mode and in response to a change in the relative position of the device and a change in a state of the device, a volume level of audio can be adjusted. The volume control mode can be activated in response to one or more activation events. In accordance with an embodiment, the volume control mode can be activated when an audio application or an application that plays audio is playing and the display screen is placed or otherwise changes to a powered off or lower powered state. It should be noted that in various embodiments, the described activation events may not be required to activate the volume control mode. For example, the volume control mode can be activated automatically in response to running the application. In response to a forward or backward movement of the device relative to a user of the device, the device can adjust a volume of the audio being played as may include increasing the volume as the device is pushed away from the user or decrease the volume as the device is pulled towards the user. In this way, a volume level can be increased or decreased based on a position of the device relative to the user.

Figures 6A, 6B:
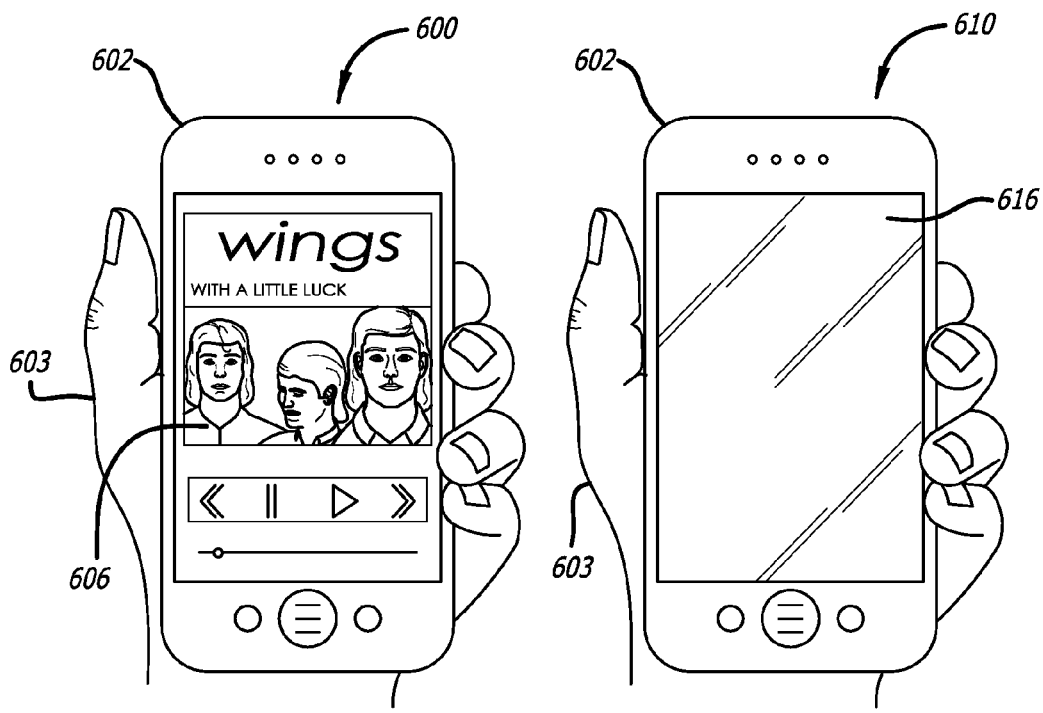
FIGS. 6A-6D illustrate an approach to activating a content control mode to adjusting a volume level of a computing device in accordance with an embodiment.
Figures 6C, 6D:
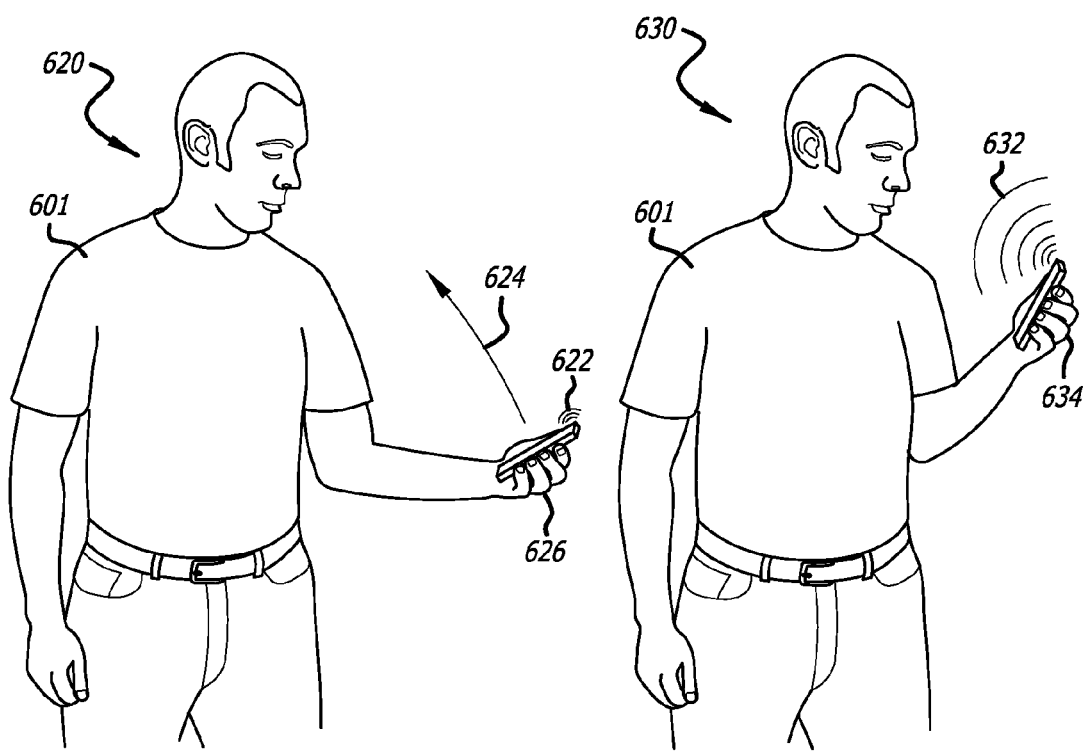

For example, as shown in situation 610 of FIG. 6B, the display screen 616 of the computing device is powered off or is in a low powered state. In accordance with various embodiments, the user can power of the display screen, for example, by pressing a button (e.g., a physical or virtual button) or other button or perform a gesture or voice command that can cause the screen to power off. In various embodiments, after a predetermined period of time of inactivity, the display screen can enter a lower power or powered off state.

In accordance with various embodiments, the activation events can cause the device to enable a volume control that can be used to adjust or otherwise modify a volume of audio being played on the device. For example, as shown in example 620 of FIG. 6C, the user 601 is holding the device at a first position 626. At this position the volume of the device is at a first volume level 622. To increase the volume of the device, the user can pull the device closer or otherwise decrease the distance of the device relative to the user as illustrated by arrow 624. As described, a number of approaches can be used to determine the distance of the device relative the user.

As the device is pulled closer to the user, the volume of the audio being played can be increased. For example, as shown in example 630 of FIG. 6D, the user has moved the device to a second position 634. Moving the device from the first position to the second position can cause the volume of the device to increase. Similarly, moving the device from the second position to the first position can decrease the volume of the device. In accordance with various embodiments, the amount of movement or the relative distance of the device to the user can be used to determine a volume level.

For example, a volume control range can be determined and used to adjust a volume of the device based at least in part on a position of the device relative to the user. In this way, a distance of the device relative to the user can correspond to a volume level. As the device is moved, the distance of the device relative to the user can be determined, and the determined distance can be mapped to a corresponding volume level. Accordingly, as the user forward or backward movement of the device relative to a user of the device can cause the device to adjust a volume of the audio being played, as may include increasing the volume as the device is pushed away from the user or decrease the volume as the device is pulled towards the user.

In accordance with various embodiments, the volume control range can be determined, for example, based at least in part on a distance of the computing device relative to the user. For example, the computing device can include a front facing camera (or other front-facing sensor such as an infrared proximity sensor), face-recognition software, and face-tracking software that can be used to detect the user relative to the device and determine between the device and the user. In one instance, the front-facing camera can be used to capture an image of the user's face, and the face-recognition software can be used by the device to determine a facial feature of the user, such as the user's eyes. Based on this determination, the device can determine a relative size of the facial feature, such as the distance between the user's eyes, and the distance between the user's eyes can be used to determine a measure of distance using techniques of photogrammetry, where the measure of distance is the distance between the detected facial feature and the device.

In response to activating the volume control mode, the device can determine a volume control range, and this range can be a range in which the volume control mode is operable. The device can determine the volume control mode based on the measure of distance and one or more characteristics associated with the user of the device, such as arm length, average viewing distance, etc. In certain embodiments, as the user operates the device, the device can refine the volume control mode based on the user's use of the device and physical characteristics, such as arm length and the like. The user's use of the device can include, for example, a history of forward and/or a backward movement of the device to determine a range of the forward and/or the backward movement. This range can be calibrated periodically, and can be used to set a volume control mode in which the volume control mode is operable. It should be noted that in some embodiments the volume control mode can be operable outside the volume control mode, on the boundary of the volume control mode, or in some portion of the volume control mode.

In accordance with various embodiments, the volume control mode can be deactivated in response to one or more events. For example, in response to activating or otherwise power on the display screen, the volume control mode can be deactivated. In such a situation, volume can be controlled in any number of conventional approaches as described herein. Various other approaches can be used as well to deactivate the volume control mode, as may include a double-tap input-based gesture, shaking the device, a voice command, an input-based gesture that includes pressing a physical button, exiting the audio playing application, or some other event.

Figure 7:
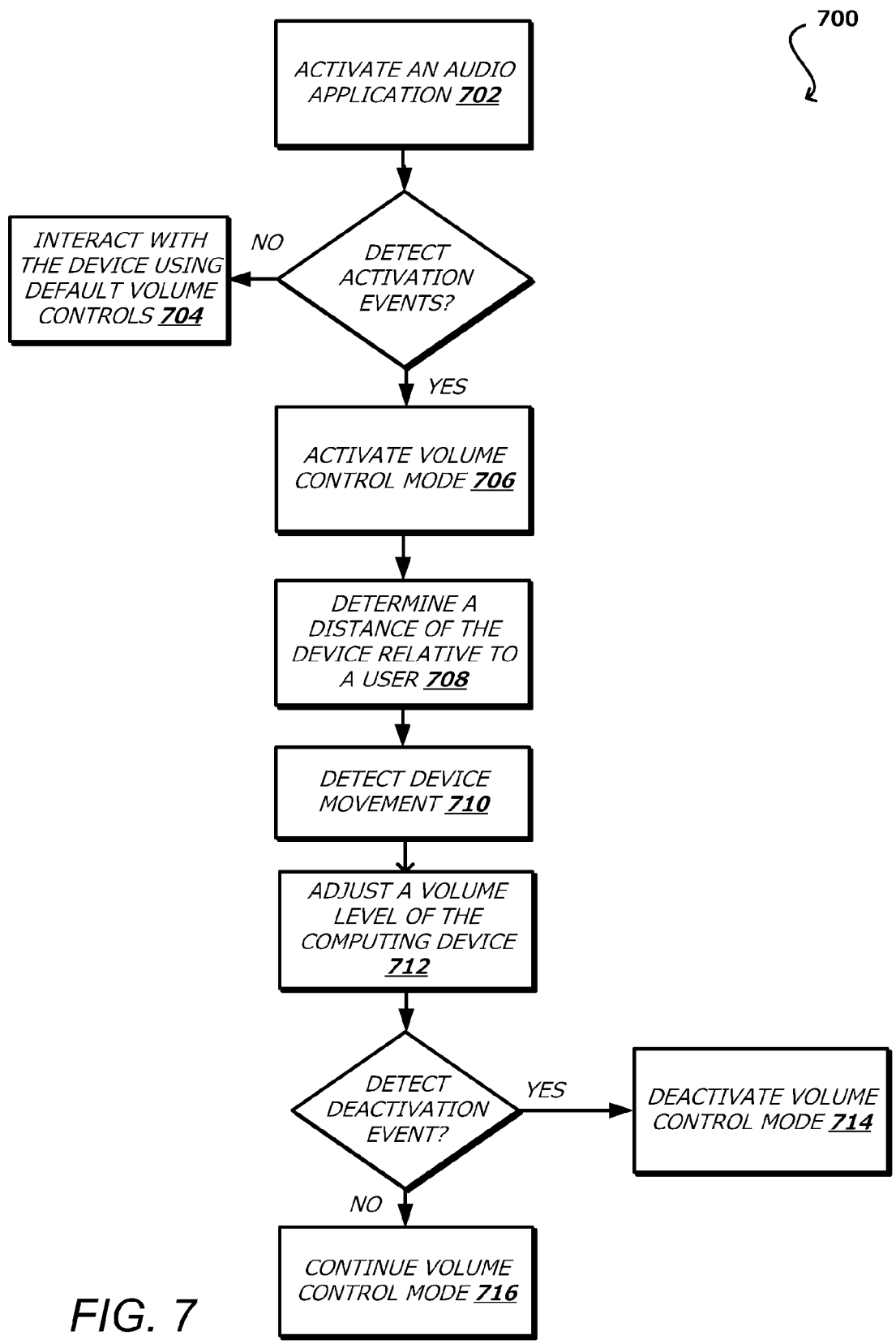
FIG. 7 illustrates an example process for adjusting a volume level of a computing device in accordance with various embodiments.

FIG. 7 illustrates an example process for adjusting a volume level of a computing device based on a position of the device relative to a viewer of the device in accordance with various embodiments. An audio or other application capable of playing audio is activated 702. In the situation where no volume control activation event is detected, a user can interact 704 with the device using the default volume controls. In the situation where one or more volume control activation events are detected, a volume control mode is activated 706. It should be noted that in various embodiments, the described activation events may not be required to activate the volume control mode. For example, the volume control mode can be activated automatically in response to running the application. In accordance with various embodiments, the one or more volume control activation events can include, for example, a change in state of the computing device, wherein the change in state corresponding to at least one of the display screen powering off or entering a low power mode A distance of the computing device with respect to a viewer of a display screen of the computing device can be determined 708 based at least in part on an image acquired by the camera or distance information acquired by a distance sensor of the computing device. A change in position or movement of the computing device relative to a user of the computing device over a predetermined volume control range is determined 710 and a volume level of the audio is adjusted 712 based at least in part on an amount of movement or position of the device relative to the user within the volume control range. In accordance with various embodiments, in response to detecting one or more deactivation events, the volume control mode can be deactivated 714. For example, in response to activating or otherwise power on the display screen, the volume control mode can be deactivated. In such a situation, volume can be controlled in any number of conventional approaches as described herein. Various other approaches can be used as well to deactivate the volume control mode, as may include a double-tap input-based gesture, shaking the device, a voice command, an input-based gesture that includes pressing a physical button, exiting the audio playing application, or some other event. In the situation where no deactivation event is detected, the volume control mode remains activated and the viewer can continue 716 adjusting the volume via the volume control mode.

As described, in accordance with various embodiments, various approaches provide a viewer with an appearance or view of content or other effect that is based at least in part upon a current relative position and/or orientation of the viewer with respect to the device, as well as changes in that relative position and/or orientation. The content can include various portions, and different adjustments can be applied to each portion based upon these and/or other such changes. These adjustments can include, for example, changes due to magnification or panning of content, or other changes in content such as adjusting a volume of an audio application which when added to the rendered or provided content in response to relative movement between a viewer and a device can enhance the experience of the viewer by allowing for single-handed adjustment of content provided by the computing device. For example, in accordance with various embodiments, portions of content displayed on a computing device can be zoomed-in on, zoomed-out on, or panned based on single-handed operation of a computing device. In other embodiments, the volume of audio played on the device can be adjusted based on single-handed operating of the computing device. In this way, as the viewer holds the device and tilts, rotates, or otherwise changes the orientation of the device, or as the viewer's relative position or orientation changes with respect to the device, the content can appear to be zoomed-in or zoomed-out on, panned, or otherwise adjusted. The relative movements can be based upon factors such as the distance of the viewer to the device, a direction of movement of the user, a direction of change in orientation of the device, or other such factors.

In various embodiments, the relative position and/or orientation of a viewer of a computing device can be determined using at least one image capture element or sensor (e.g., gyroscope, accelerometer, etc.) of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. For example, the device can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

In accordance with certain embodiments, the touch-based gesture input can cause the device to enable other content control modes, such as a brightness mode that can be used to change the relative lightness of the image, a contrast mode that can be used to change the difference between the darkest and lightest areas of an image, or any other image control mode that can be used to manipulate, enhance or otherwise adjust the image by moving the device relative to the user. For example, upon invoking an content control mode, the user can use a thumb or finger of the hand holding the device to select or interact with one or more user-selectable elements, objects, or portions of the interface displayed on the screen of the device, such as by touching the screen at a location associated with one of the user-selectable elements for at least a determined period of time to activate or change the content control mode. For example, each user-selectable element can enable an associated content control mode when selected, and when one of the user-selectable elements is selected, movement of the device such as tilting can cause the content control mode associated with the selected user-selectable element to be performed at least during the time the user-selectable element is selected, while the device is moved, or for some other period of time or action. A subsequent selection of the same user-selectable element can disable the content control associated with that user-selectable element. Alternatively, selecting one of the user-selectable elements can toggle between different content control modes. For example, as described above, an content control modes can include one of such a zoom control mode, a brightness control mode, a contrast control mode, or any other mode that can be used to manipulate, enhance or otherwise adjust the image, and selecting the user-selectable element can toggle between the different content control modes.

Various approaches can be utilized for locating one or more desired features of a user's face to determine various aspects useful for determining relative orientation. For example, an image can be analyzed to determine the approximate location and size of a user's head or face. FIG. 8A illustrates an example wherein the approximate position and area of a user's head or face 800 is determined and a virtual "box" 802 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 804 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Various other algorithms can be used to determine the location of features on a user's face. For example, FIG. 8B illustrates an example wherein various features on a user's face are identified and assigned a point location 806 in the image. The system thus can detect various aspects of user features and can determine more subtle changes in orientation. Such an approach provides advantages over the general approach of FIG. 8A in certain situations, as various other features can be determined, in case the user's eyes cannot be seen due to glasses, hair, etc.

Figure 8E:
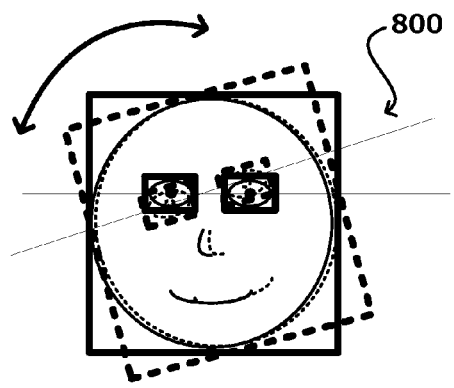
Figure 8F:
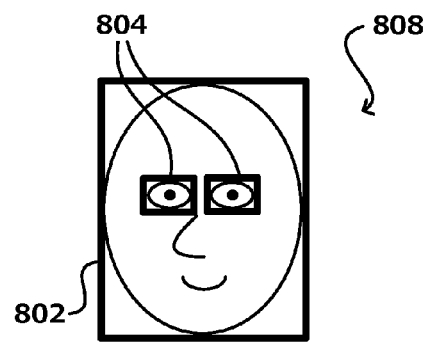

Once the positions of facial features of a user are identified, relative motion between the user and the device can be detected and utilized as input. For example, FIG. 8C illustrates an example where the user's head 800 is moving up and down with respect to the viewable area of the imaging element. As discussed, this could be the result of the user moving his or her head, or the user moving the device up and down, etc. FIG. 8D illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 8E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 8F illustrates another advantage of using an approach such as that described with respect to FIG. 8B to determine the position of various features on a user's face. In this exaggerated example, it can be seen that the features of a second user's head 808 have a different relative position and separation. Thus, the device also can not only determine positions of features for a user, but can distinguish between different users.

Figure 9A:
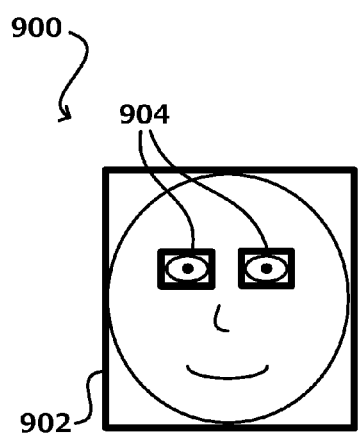
FIGS. 9A and 9B illustrate example approaches to determining changes in the relative distance to a user that can be used in accordance with various embodiments
Figure 9B:
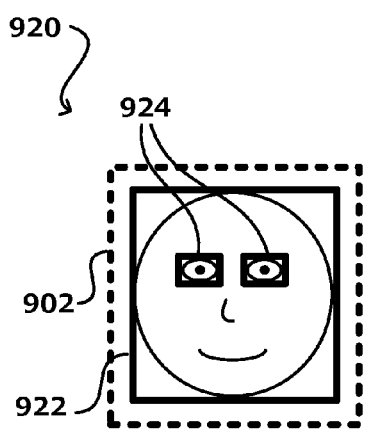

FIGS. 9A and 9B illustrate an example approach that can be used to determine variations in relative distance between a user and a device that can be used in accordance with various embodiments. As in FIG. 9A, the approximate position and area of a user's head or face 900 is determined and a virtual "box" 902 is placed around the face at an initial distance as an indication of distance using one of a plurality of image analysis algorithms for making such a determination. If the user is known, the size of the user's head might be stored such that an actual distance to the user can be calculated based at least in part upon the size of the box 902. If the user is not known, the distance can be estimated or determined using other factors, such as stereoscopic imaging. In some embodiments, determinations will be relative with respect to an initial box size when the actual distance cannot be determined As the distance between the user and the device changes, the size of the virtual box will change as well. For example, in FIG. 9B the distance between the user and the device has increased, such that the user's head 920 appears smaller in the captured image information. Accordingly, the size of the virtual box 922 for the adjusted size of the user's head is smaller than the original box 902 for the initial distance. By monitoring adjustments in the size of the box or another measure of the user's head and/or other such features (e.g., boxes 924), the device can determine an approximate distance and/or change in distance to the user. As discussed, this information can be used to adjust aspects of the displayed image information such as a level of zoom or amount of detail.

Figure 10A:
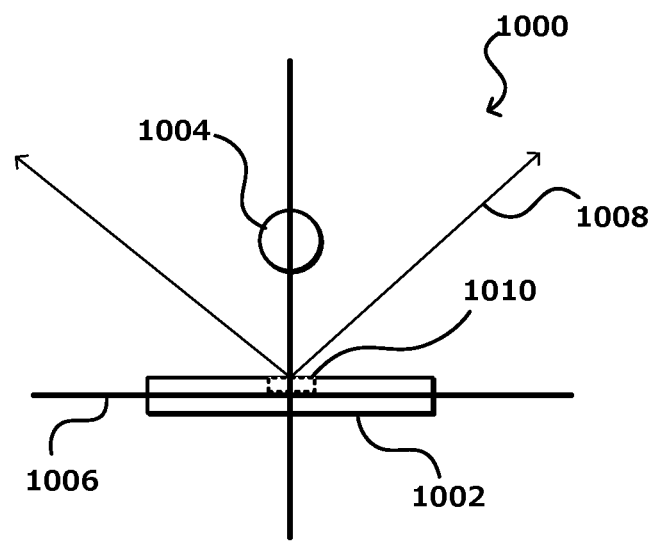
FIGS. 10A and 10B illustrate an example approach to determining device motion that can be utilized in accordance with various embodiments.

For example, FIG. 10A illustrates a "top view" 1000 of a computing device 1002 operable to capture an image of an object 1004 (e.g., a user's head) within an angular view 1008 of a camera 1010 of the computing device. In this example, the computing device 1002 includes at least one orientation- or rotation-determining element, such as an electronic compass or electronic gyroscope, that is able to determine a frame of reference 1006 in two or three dimensions with respect to a first orientation of the device. In at least some embodiments, an electronic compass might be used to determine an axis of the frame of reference 1006, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 1006 or orientation can be determined at or near the time of capture of a first image by a camera 1010 of the computing device 1002. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 10B:
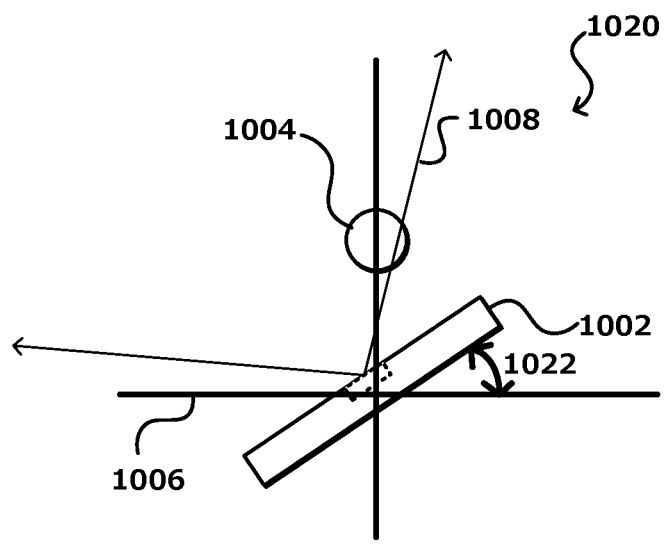

FIG. 10B illustrates a second top view 1020 after a change in orientation of the computing device 1002. The electronic gyroscope (or other such component or embedded sensor) can detect the change in orientation, in this example corresponding to a change in angle 1022 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 1022 about a single axis. As illustrated, this causes the object 1004 to be moved to the right edge of the field of view 1008 of the camera. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

Figure 11:
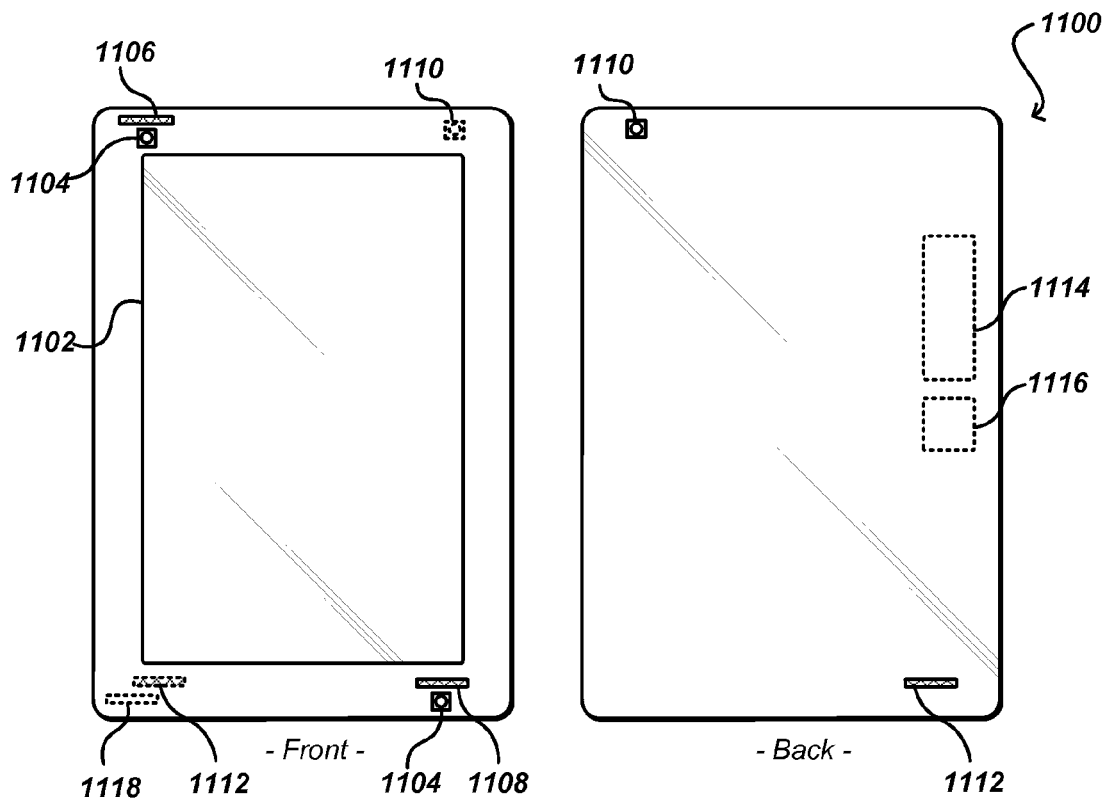
FIG. 11 illustrates front and back views of an example portable computing device that can be used in accordance with various embodiments.

FIG. 11 illustrates front and back views of an example electronic computing device 1100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1100 has a display screen 1102 (e.g., an LCD element) operable to display information or image content to one or more users or viewers of the device. The display screen of some embodiments displays information to the viewers facing the display screen (e.g., on the same side of the computing device as the display screen). The computing device can include a touch sensor configured to detect contact with the display screen. For example, a touch-based input or gesture such as a tap and hold, tab and drag, or any other touch-based input or contact with the display screen can be detect by the touch sensor. Information characterizing or otherwise defining the touch-based input can be provided to a device processor for processing. The computing device in this example can include one or more imaging elements, in this example including two image capture elements 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled device (CCD), a motion detection sensor or an infrared sensor, or other image capturing technology.

As discussed, the device can use the images (e.g., still or video) captured from the imaging elements 1104 and 1110 to generate a three-dimensional simulation of the surrounding environment (e.g., a virtual reality of the surrounding environment for display on the display screen of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1108 on the front side, one microphone 1112 on the back, and one microphone 1106 on or near a top or side of the device. In some devices there may be only one microphone, while in other devices there might be at least one microphone on each side and/or corner of the device, or in other appropriate locations.

The device 1100 in this example also includes one or more orientation- or position-determining elements 1118 operable to provide information such as a position, direction, motion, or orientation of the device. These elements can include, for example, accelerometers, inertial sensors, electronic gyroscopes, and electronic compasses.

The example device also includes at least one communication mechanism 1114, such as may include at least one wired or wireless component operable to communicate with one or more electronic devices. The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

Figure 12:
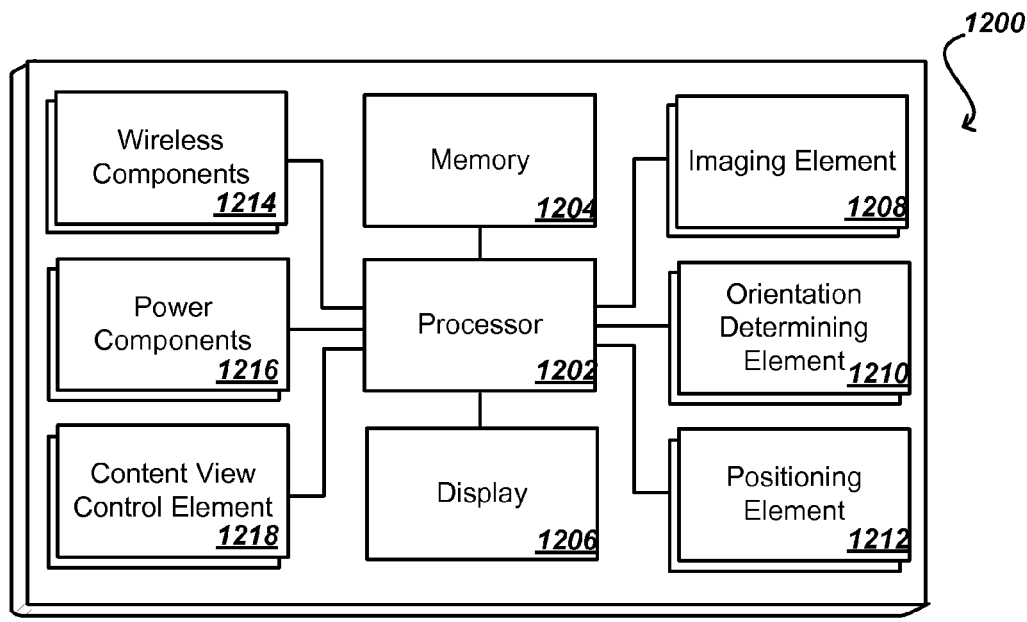
FIG. 12 illustrates an example set of basic components of a portable computing device, such as the device described with respect to FIG. 11.

FIG. 12 illustrates a set of basic components of an electronic computing device 1200 such as the device 1100 described with respect to FIG. 11. In this example, the device includes at least one processing unit 1202 for executing instructions that can be stored in a memory device or element 1204. As would be apparent to one of ordinary skill in the art, the device can include many types of memory, data storage, or computer-readable media, such as a first data storage for program instructions for execution by the processing unit(s) 1202, the same or separate storage can be used for images or data, a removable memory can be available for sharing information with other devices, and any number of communication approaches can be available for sharing with other devices.

The device typically will include some type of display screen 1206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1200 also includes at least one orientation determining element 1210 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1212 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

The example device also includes one or more wireless components 1214 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include a content view control element 1218 to, for example, detect a touch-based gesture input on an area of interest of the content, the touch-based gesture input corresponding to at least a double-tap on the display screen; activate a content view control mode; display a graphical element at least proximate to the area of interest, the graphical element indicating that the content view control mode is activated; animate a centering of the area of interest on the display screen; determine a change in position of the computing device relative to a viewer of the display screen; determine a change in an angle of the computing device with respect to the viewer over a predetermined scaling range based at least in part on the change in position of the computing device; and adjust a zoom level of the content being displayed based at least in part on the angle of the computing device meeting at least a threshold angle.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display screen may likewise tilt to keep the content in orientation with the user.

Figure 13:
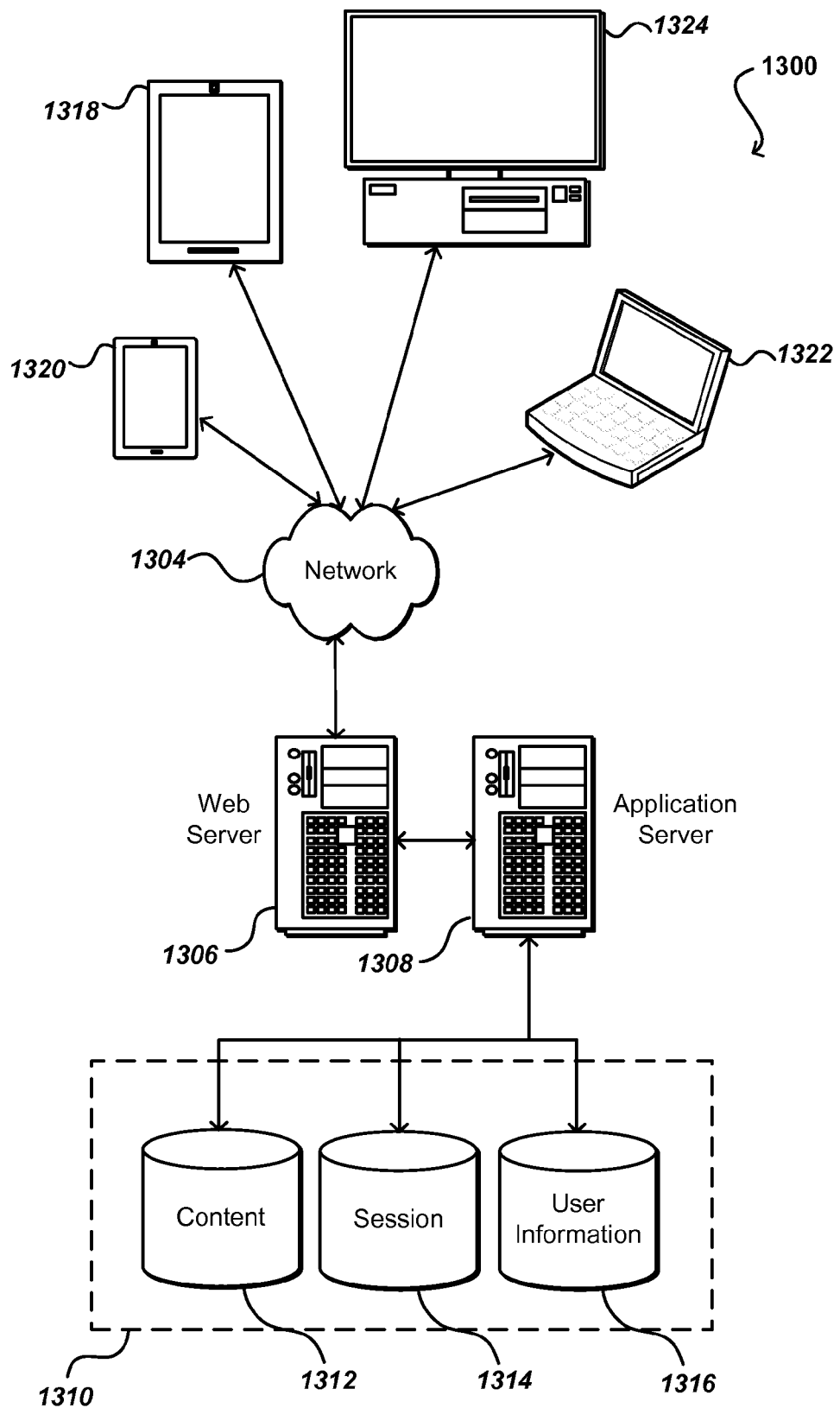
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes electronic client devices 1318, 1320, 1322, and 1324, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client devices 1318, 1320, 1322, and 1324 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1318, 1320, 1322 and 1324. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a touch screen;
   at least one camera;
   at least one computing device processor; and
   at least one memory device including instructions that, when executed by the at least one computing device processor, cause the computing device to:
   display a first portion of content on the touch screen;
   determine whether the computing device is operating in a single-handed operation mode;
   detect a touch input on the touch screen where the first portion of the content is displayed, wherein the touch input corresponds to a portion of a single hand of a user, and wherein the portion of the single hand maintains contact with the touch screen for a time period;
   acquire, within the time period, image data within a field of view associated with the at least one camera;
   analyze the image data to determine whether an amount of a change in position of the computing device relative to the user represented in a portion of the image data satisfies a threshold amount;
   determine a scaling range based on a history of movement of the computing device; and
   display a second portion of the content by adjusting a scale associated with the first portion of the content, wherein the adjusting of the scale is based on a scale amount determined based on the amount of the change in position of the computing device relative to the user and the scaling range, and wherein the second portion of the content includes at least a subset of the first portion of the content, wherein the instructions when executed further cause the computing device to: acquire a first image from the image data; determine a first location of a first representation of the user in the first image; acquire a second image from the image data; determine a second location of a second representation of the user in the second image; and determine the amount of the change in position of the computing device relative to the user based on a change between the first location and the second location and the field of view associated with the at least one camera.

2. The computing device of claim 1, wherein the instructions when executed further cause the computing device to perform at least one of: (a) detect a forward tilt of the computing device relative to the user; and generate the second portion of the content by laterally shifting the subset of the first portion of the content towards a direction corresponding to the forward tilt; (b) detect a backward tilt of the computing device relative to the user; and generate the second portion of the content by laterally shifting the subset of the first portion of the content towards a direction corresponding to the backward tilt; (c) detect a clockwise rotation of the computing device relative to the user; and generate at least some of the second portion of the content by laterally shifting the subset of the first portion of the content towards a direction corresponding to the clockwise rotation; or (d) detect a counterclockwise rotation of the computing device relative to the user; and generate the second portion of the content by laterally shifting the subset of the first portion of the content towards a direction corresponding to the counterclockwise rotation.

3. The computing device of claim 1, wherein the instructions when executed further cause the computing device to:
   detect a release of the portion of the single hand from the touch screen; and
   deactivate a content control mode for controlling display of data by the touch screen.

4. A computer implemented method, comprising:
   presenting a first portion of content via a computing device;
   determining whether the computing device is operating in a first hand mode;
   detecting a touch input on a touch sensor associated with the computing device, wherein the touch input corresponds to a portion of a hand of a user, and wherein the portion of the hand maintains contact with the touch sensor for a time period;
   determining whether an amount of movement of the computing device relative to the user satisfies a threshold amount;
   determining a scaling range based on a history of movement of the computing device; and
   presenting a second portion of the content by adjusting a scale associated with the first portion of the content, wherein the adjusting of the scale is based on a scale amount determined based on the amount of movement of the computing device relative to the user and the scaling range, and wherein the second portion of the content includes at least a subset of the first portion of the content, acquiring a first image including a first representation of the user using at least one camera associated with the computing device; determining a first location of the first representation of the user in the first image; acquiring a second image including a second representation of the user using the at least one camera; determining a second location of the second representation of the user in the second image; and determining the amount of movement of the computing device relative to the user based on a change between the first location and the second location and an angular field of view associated with the at least one camera.

5. The computer implemented method of claim 4, further comprising: detecting the touch input where the first portion of the content is resented and activating, in response to the detecting of the touch input, at least one of a panning control mode, a scale control mode, or a volume control mode for controlling presentation of data via the computing device.

6. The computer implemented method of claim 4, further comprising at least one of: (a) detecting a forward tilt of the computing device relative to the user; and generating the second portion of the content by, laterally shifting the subset of the first portion of the content towards a direction corresponding to the forward tilt; (b) detecting a backward tilt of the computing device relative to the user; and generating the second portion of the content by laterally shifting the subset of the first portion of the content towards a direction corresponding to the backward tilt; (c) detecting a clockwise rotation of the computing device relative to the user; and generating the second portion of the content by laterally shifting the subset of the first portion of the content towards a direction corresponding to the clockwise rotation; or (d) detecting a counterclockwise rotation of the computing device relative to the user; and generating the second portion of the content by laterally shifting the subset of the first portion of the content towards a direction corresponding to the counterclockwise rotation.

7. The computer implemented method of claim 4, further comprising:
detecting a release of the portion of the hand from the touch sensor; and
deactivating a content control mode for controlling presentation of data via the computing device.

8. The computer implemented method of claim 4, further comprising: detecting the touch input where the first portion of the content is presented; activating, in response to the detecting of the touch input, a scale control mode for controlling the scale associated with data displayed via the computing device; determining a first distance between the computing device and the user based on a first image acquired by at least one camera associated with the computing device or first distance information acquired by at least one distance sensor associated with the computing device; determining a second distance between the computing device and the user based on a second image acquired by the at least one camera or second distance information acquired by the at least one distance sensor; determining the first amount of movement of the computing device relative to the user based on a change between the first distance and the second distance with respect to the scaling range; and generating at least some of the second portion of the content by adjusting the scale associated with the first portion of the content displayed within the first area based on the scale amount with respect to the scaling range.

9. The computer implemented method of claim 8, further comprising: fixing the first portion of the content where the touch input is detected.

10. The computer implemented method of claim 4, further comprising:
detecting at least one of a display screen associated with the computing device powering off or the display screen entering a low power mode;
activating a volume control mode for controlling a volume of at least one speaker associated with the computing device;
determining the amount of movement of the computing device relative to the user based on a change in position of the computing device relative to the user with respect to a predetermined volume control range; and
adjusting a volume level of the at least one speaker based on the volume amount with respect to the predetermined volume control range.

11. The computer implemented method of claim 10, further comprising at least one of:
increasing the volume level in response to determining that the amount of movement of the computing device relative to the user corresponds to an increase in distance between the computing device and the user; or
decreasing the volume level in response to determining that the amount of movement of the computing device relative to the user corresponds to a decrease in distance between the computing device and the user.

12. The computer implemented method of claim 4, further comprising:
presenting feedback indicating that a content control mode for controlling presentation of data via the computing device is activated, the feedback including at least one of a graphical element displayed on a display screen associated with the computing device, a sound generated by at least one speaker associated with the computing device, or a haptic response generated by at least one haptic component associated with the computing device.

13. The computer implemented method of claim 4, further comprising:
determining the amount of movement of the computing device relative to the user based on an angle of tilt of the computing device relative to the user.

14. The computer implemented method of claim 13, further comprising: detecting a first angle of tilt that meets a first threshold angle associated with the threshold amount; generating the second portion of the content by laterally shifting at least the subset of the first portion of the content by the scale amount; detecting a second angle of tilt that meets a second threshold angle associated with a second threshold amount; and generating a third portion of the content by laterally shifting at least a subset of the second portion of the content by a second amount determined based on the scale amount, wherein the second angle of tilt is greater than the first angle of tilt.

15. A non-transitory computer readable storage medium storing instructions, when executed by one or more processors, cause the one or more processors to perform: presenting a first portion of content via a computing device; determining whether the computing device is operating in a first hand mode;
detecting a touch input on a touch sensor associated with the computing device, wherein the touch input corresponds to a portion of a hand of a user, and wherein the portion of the hand maintains contact with the touch sensor for a time period;
determining an amount of movement of the computing device relative to the user;
determining a scaling range based on a history of movement of the computing device; and
presenting a second portion of the content by adjusting a scale associated with the first portion of the content, wherein the adjusting of the scale is based on scale amount determined based at on the first amount of movement of the computing device relative to the user and the scaling range, and wherein the second portion of the content includes at least a subset of the first portion of the content, wherein the instructions when executed further cause the one or more processors to perform: detecting the touch input where the first portion of the content is presented; activating, in response to the detecting of the touch input, a scale control mode for controlling the scale associated with data displayed via the computing device; determining a first distance between the computing device and the user based part on a first image acquired by at least one camera associated with the computing device or first distance information acquired by at least one distance sensor associated with the computing device;

determining a second distance between the computing device and the user based on a second image acquired by the at least one camera or second distance information acquired by the at least one distance sensor; determining the amount of movement of the computing device relative to the user based on a change between the first distance and the second distance with respect to the scaling range; generating the second portion of the content by adjusting the scale associated with the first portion of the content presented within the first area based on the scale amount with respect to the scaling range; and fixing the first portion of the content where the touch input is detected.

16. The non-transitory computer readable storage medium of claim 15, wherein the instructions when executed further cause the one or more processors to perform:

detecting at least one of a display screen associated with the computing device powering off or the display screen entering a low power mode;

activating a volume control mode for controlling a volume of at least one speaker associated with the computing device;

determining the amount of movement of the computing device relative to the user based on a change in position of the computing device relative to the user with respect to a predetermined volume control range; and adjusting a volume level of the at least one speaker based on the amount of movement of the computing device relative to the user with respect to the predetermined volume control range, wherein adjusting the volume level includes at least one of increasing the volume level in response to determining that the amount of movement of the computing device relative to the user corresponds to an increase in distance between the computing device and the user, or decreasing the volume level in response to determining that the amount of movement of the computing device relative to the user corresponds to a decrease in distance between the computing device and the user.

17. The non-transitory computer readable storage medium of claim 15, wherein the instructions when executed further cause the one or more processors to perform:

detecting a release of the portion of the hand from the touch sensor; and deactivating a content control mode for controlling presentation of data via the computing device.

* * * * *